(12) United States Patent
Panchaksharaiah et al.

(10) Patent No.: US 12,652,445 B2
(45) Date of Patent: **\*Jun. 9, 2026**

(54) SYSTEMS AND METHODS FOR DYNAMICALLY EXTENDING OR SHORTENING SEGMENTS IN A PLAYLIST

(71) Applicant: Adeia Guides Inc., San Jose, CA (US)

(72) Inventors: Vishwas Sharadanagar Panchaksharaiah, Karnataka (IN); Vikram Makam Gupta, Karnataka (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/911,955

(22) Filed: Oct. 10, 2024

(65) Prior Publication Data

US 2025/0106485 A1 Mar. 27, 2025

Related U.S. Application Data

(63) Continuation of application No. 17/837,528, filed on Jun. 10, 2022, now Pat. No. 12,143,694, which is a
(Continued)

(51) Int. Cl.
*H04N 21/845* (2011.01)
*G06F 16/438* (2019.01)
(Continued)

(52) U.S. Cl.
CPC ..... *H04N 21/8456* (2013.01); *G06F 16/4387* (2019.01); *G06F 16/447* (2019.01);
(Continued)

(58) Field of Classification Search
CPC ......... H04N 21/8456; H04N 21/26258; H04N 21/4825; H04N 21/8549; G06F 16/447; G06F 16/4387
See application file for complete search history.

(56) References Cited

U.S. PATENT DOCUMENTS 981,378 A 1/1911 Byrnes
6,239,794 B1 5/2001 Yuen et al.
(Continued)

FOREIGN PATENT DOCUMENTS

WO 2006094131 A2 9/2006

OTHER PUBLICATIONS

PCT International Search Report for International Application No. PCT/US2018/039423, mailed Oct. 5, 2018 (15 Pages).

*Primary Examiner* — Yassin Alata
(74) *Attorney, Agent, or Firm* — HG LAW LLP

(57) ABSTRACT

Systems and methods are disclosed herein for dynamically modifying a playlist for reviewing highlights of a media event. A playlist comprising highlights of a media event may be generated by a media guidance application. A user command may be received by the media guidance application to extend or shorten the currently-playing segment of the playlist. To generate a longer version of the segment, the media guidance application may access the media asset from which the playlist was originally generated at a position corresponding to the currently-playing segment, and generate a longer version of the segment. To generate a shorter version of the segment, the media guidance application may remove a portion of the currently-playing segment. The media guidance application may replace the currently-playing segment with, and begin playing back, the modified version of the segment.

20 Claims, 10 Drawing Sheets

Related U.S. Application Data continuation of application No. 17/241,316, filed on Apr. 27, 2021, now Pat. No. 11,388,488, which is a continuation of application No. 15/823,115, filed on Nov. 27, 2017, now Pat. No. 11,025,998.

(51) Int. Cl.

| | | |
|---|---|---|
| *G06F 16/44* | (2019.01) | |
| *H04N 21/262* | (2011.01) | |
| *H04N 21/482* | (2011.01) | |
| *H04N 21/8549* | (2011.01) | |

(52) U.S. Cl.

CPC ... *H04N 21/26258* (2013.01); *H04N 21/4825* (2013.01); *H04N 21/8549* (2013.01)

(56) References Cited

U.S. PATENT DOCUMENTS

| | | | |
|---|---|---|---|
| 6,564,378 | B1 | 5/2003 | Satterfield et al. |
| 7,165,098 | B1 | 1/2007 | Boyer et al. |
| 7,406,655 | B2 | 7/2008 | Jun |
| 7,739,601 | B1 | 6/2010 | Wong et al. |
| 7,761,892 | B2 | 7/2010 | Ellis et al. |
| 8,046,801 | B2 | 10/2011 | Ellis et al. |
| 9,002,175 | B1 | 4/2015 | Raj |
| 9,583,144 | B2 | 2/2017 | Ricciardi |
| 9,813,784 | B1 * | 11/2017 | Carlson .............. H04N 21/4722 |
| 10,390,082 | B2 | 8/2019 | Song et al. |
| 11,388,488 | B2 | 7/2022 | Panchaksharaiah et al. |
| 12,143,694 | B2 | 11/2024 | Panchaksharaiah et al. |
| 2002/0056100 | A1 | 5/2002 | Shimomura et al. |
| 2002/0174430 | A1 | 11/2002 | Ellis et al. |
| 2005/0005308 | A1 | 1/2005 | Logan et al. |
| 2005/0010953 | A1 | 1/2005 | Carney et al. |
| 2005/0086682 | A1 | 4/2005 | Burges et al. |
| 2005/0251827 | A1 | 11/2005 | Ellis et al. |
| 2005/0278759 | A1 | 12/2005 | Unger |
| 2006/0107301 | A1 | 5/2006 | Leibbrandt et al. |
| 2007/0113250 | A1 | 5/2007 | Logan et al. |
| 2007/0154169 | A1 | 7/2007 | Cordray et al. |
| 2008/0155627 | A1 | 6/2008 | Oconnor et al. |
| 2010/0153885 | A1 | 6/2010 | Yates |
| 2011/0052146 | A1 | 3/2011 | Murthy et al. |
| 2014/0321831 | A1 | 10/2014 | Olsen et al. |
| 2014/0325568 | A1 | 10/2014 | Hoang et al. |
| 2015/0037013 | A1 | 2/2015 | Thomas et al. |
| 2015/0067723 | A1 | 3/2015 | Bloch et al. |
| 2016/0080835 | A1 | 3/2016 | Von Sneidern et al. |
| 2016/0105708 | A1 | 4/2016 | Packard et al. |
| 2016/0105733 | A1 | 4/2016 | Packard et al. |
| 2016/0105734 | A1 | 4/2016 | Packard et al. |
| 2016/0373817 | A1 | 12/2016 | Drake et al. |
| 2017/0257651 | A1 | 9/2017 | Zhu et al. |
| 2018/0025078 | A1 | 1/2018 | Quennesson |
| 2018/0103276 | A1 | 4/2018 | Piron et al. |
| 2018/0199080 | A1 | 7/2018 | Jackson et al. |
| 2019/0166412 | A1 | 5/2019 | Panchaksharaiah et al. |
| 2019/0267041 | A1 | 8/2019 | Ricciardi |
| 2021/0250665 | A1 | 8/2021 | Panchaksharaiah et al. |
| 2022/0321979 | A1 | 10/2022 | Panchaksharaiah et al. |

* cited by examiner

104

```
① – Skip this highlight              (-1:35)
② – Skip similar highlights          (-7:19)
③ – Skip all from this event        (-38:30)
(▥) – Exit highlights
(Exit) – Cancel
```

106

```
① – Shorten this highlight           (-0:35)
② – Shorten similar highlights       (-4:15)
③ – Shorten all from this event     (-20:43)
(▥) – Exit highlights
(Exit) – Cancel
```

108

```
① – Shorten this highlight           (-0:35)
② – Shorten similar highlights       (-4:15)
③ – Shorten all from this event     (-20:43)
④ – Skip this highlight              (-1:35)
⑤ – Skip similar highlights          (-7:19)
⑥ – Skip all from this event        (-38:30)
(▥) – Exit highlights
(Exit) – Cancel
```

110

```
① – View 30 seconds pre/post         (+1:00)
② – View 2 minutes pre/post          (+4:00)
③ – View 5 minutes pre/post         (+10:00)
④ – View entire event          (90:00 total)
⑤ – Skip this highlight              (-1:35)
⑥ – Skip similar highlights          (-7:19)
⑦ – Skip all from this event        (-38:30)
(▥) – Exit highlights
(Exit) – Cancel
```

112

```
① – View 30 seconds pre/post         (+1:00)
② – View 2 minutes pre/post          (+4:00)
③ – View 5 minutes pre/post         (+10:00)
④ – View entire event          (90:00 total)
⑤ – Shorten this highlight           (-0:35)
⑥ – Shorten similar highlights       (-4:15)
⑦ – Shorten all from this event     (-20:43)
(▥) – Exit highlights
(Exit) – Cancel
```

114

```
① – View 30 seconds pre/post         (+1:00)
② – View 2 minutes pre/post          (+4:00)
③ – View 5 minutes pre/post         (+10:00)
④ – View entire event          (90:00 total)
⑤ – Shorten this highlight           (-0:35)
⑥ – Shorten similar highlights       (-4:15)
⑦ – Shorten all from this event     (-20:43)
⑧ – Skip this highlight              (-1:35)
⑨ – Skip similar highlights          (-7:19)
⓪ – Skip all from this event        (-38:30)
(▥) – Exit highlights
(Exit) – Cancel
```

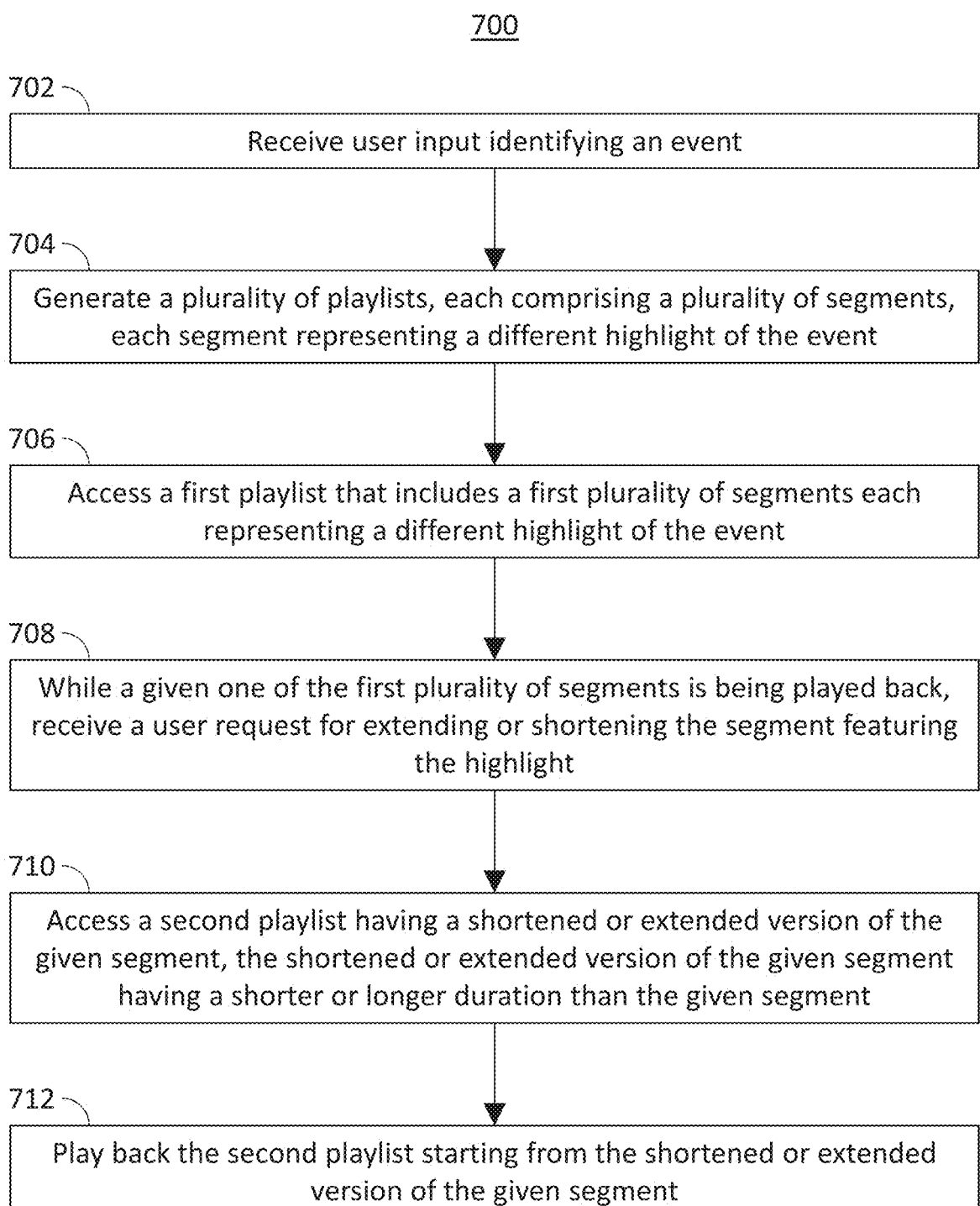

700

702 —
Receive user input identifying an event

704 —
Generate a plurality of playlists, each comprising a plurality of segments, each segment representing a different highlight of the event 706 —
Access a first playlist that includes a first plurality of segments each representing a different highlight of the event 708 —
While a given one of the first plurality of segments is being played back, receive a user request for extending or shortening the segment featuring the highlight 710 —
Access a second playlist having a shortened or extended version of the given segment, the shortened or extended version of the given segment having a shorter or longer duration than the given segment 712 —
Play back the second playlist starting from the shortened or extended version of the given segment

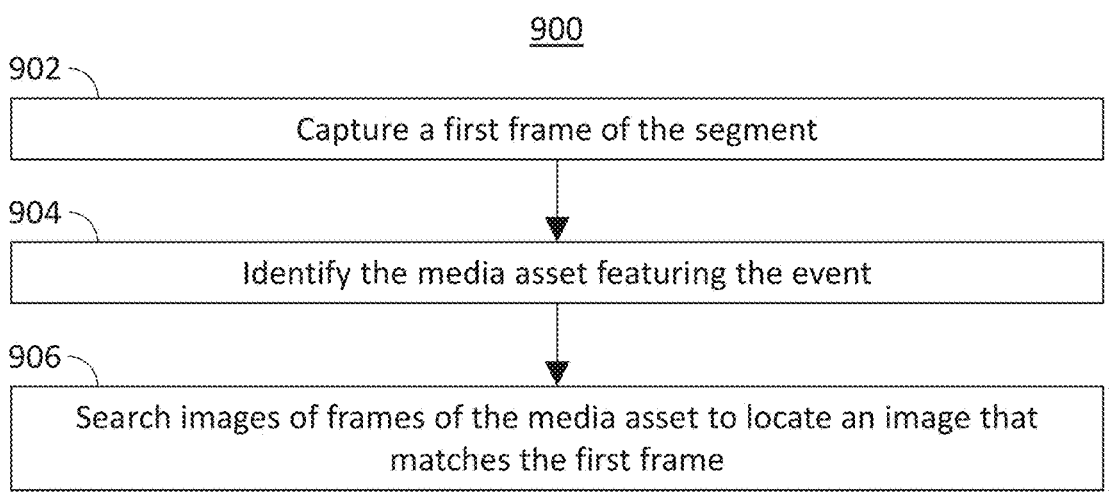

902 — Capture a first frame of the segment

904 — Identify the media asset featuring the event

906 — Search images of frames of the media asset to locate an image that matches the first frame

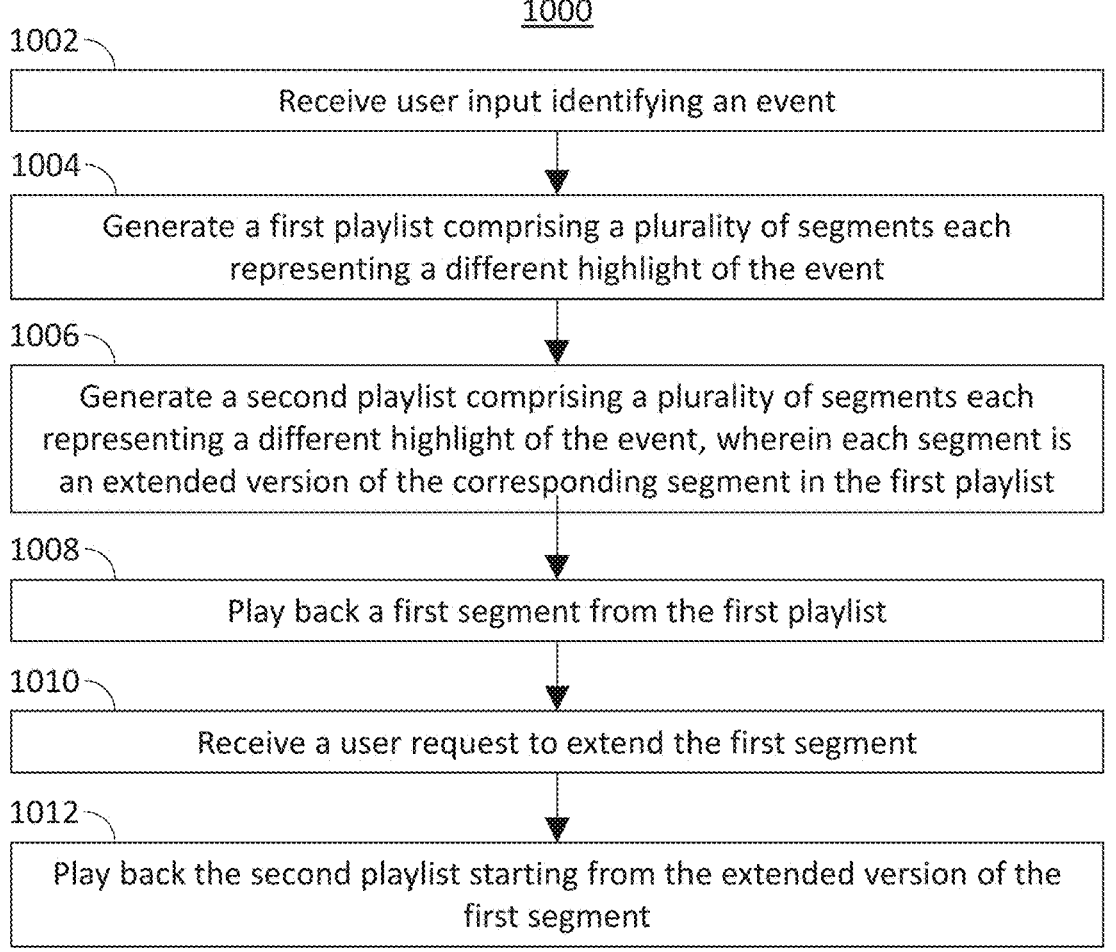

1002 — Receive user input identifying an event

1004 — Generate a first playlist comprising a plurality of segments each representing a different highlight of the event 1006 — Generate a second playlist comprising a plurality of segments each representing a different highlight of the event, wherein each segment is an extended version of the corresponding segment in the first playlist 1008 — Play back a first segment from the first playlist 1010 — Receive a user request to extend the first segment 1012 — Play back the second playlist starting from the extended version of the first segment

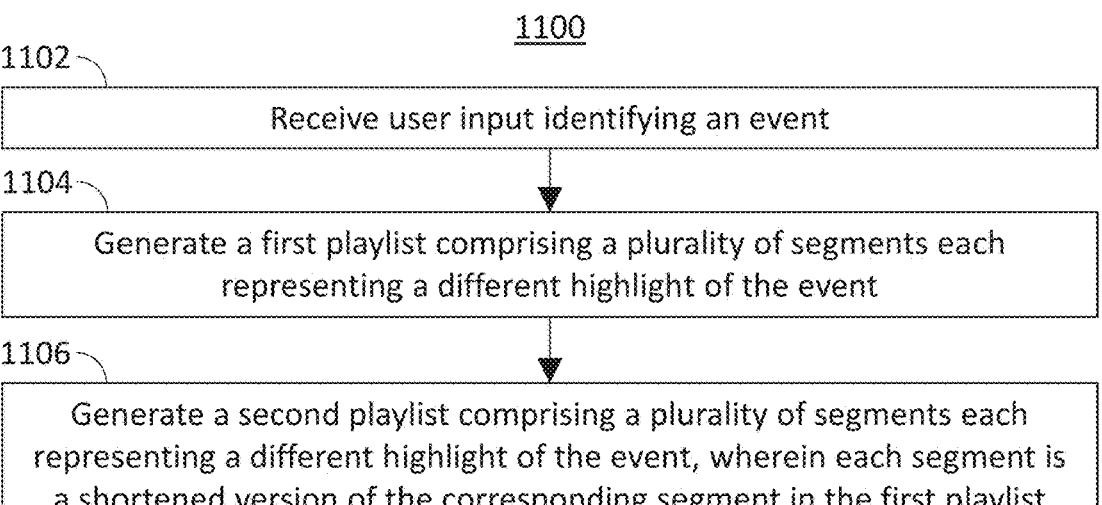

1102 — Receive user input identifying an event

1104 — Generate a first playlist comprising a plurality of segments each representing a different highlight of the event 1106 — Generate a second playlist comprising a plurality of segments each representing a different highlight of the event, wherein each segment is a shortened version of the corresponding segment in the first playlist

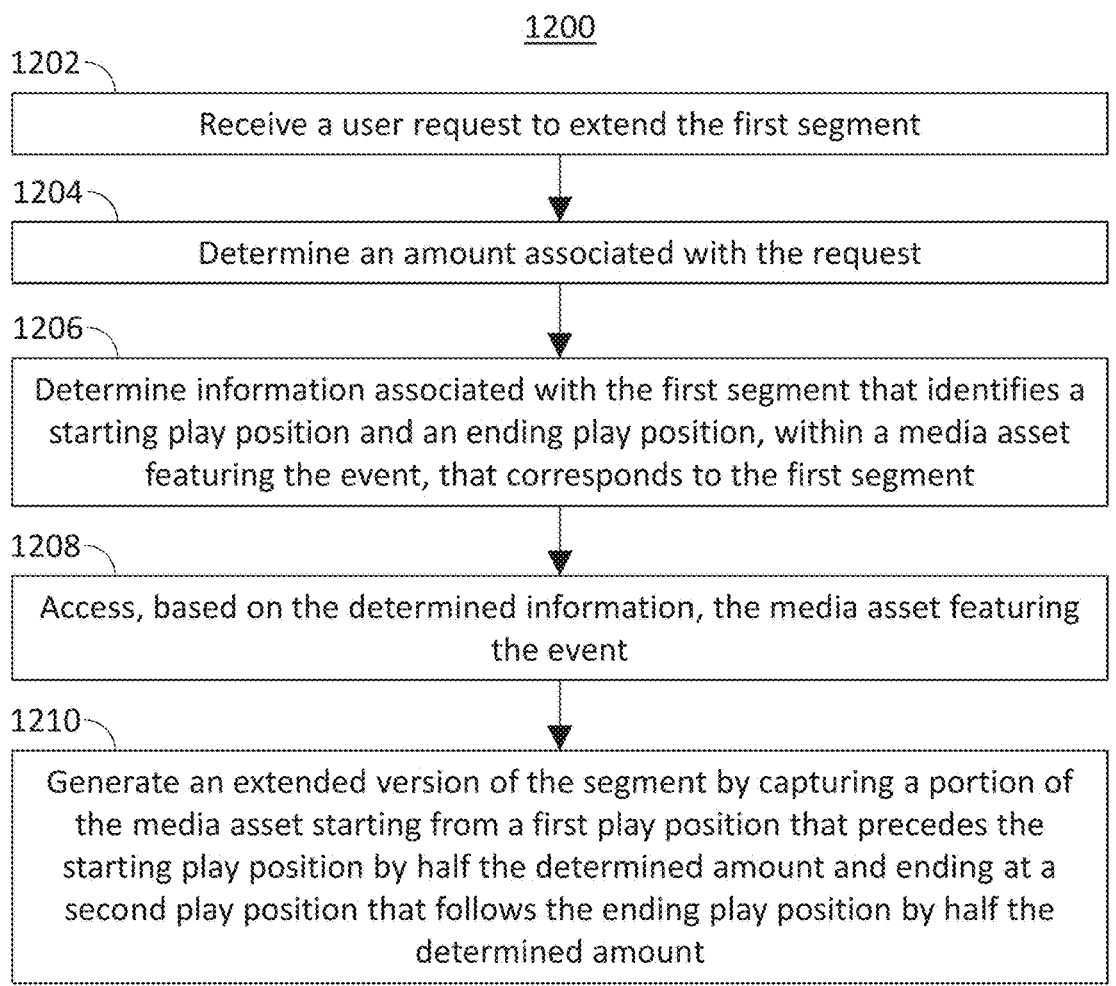

1202 — Receive a user request to extend the first segment

1204 — Determine an amount associated with the request

1206 — Determine information associated with the first segment that identifies a starting play position and an ending play position, within a media asset featuring the event, that corresponds to the first segment 1208 — Access, based on the determined information, the media asset featuring the event 1210 — Generate an extended version of the segment by capturing a portion of the media asset starting from a first play position that precedes the starting play position by half the determined amount and ending at a second play position that follows the ending play position by half the determined amount

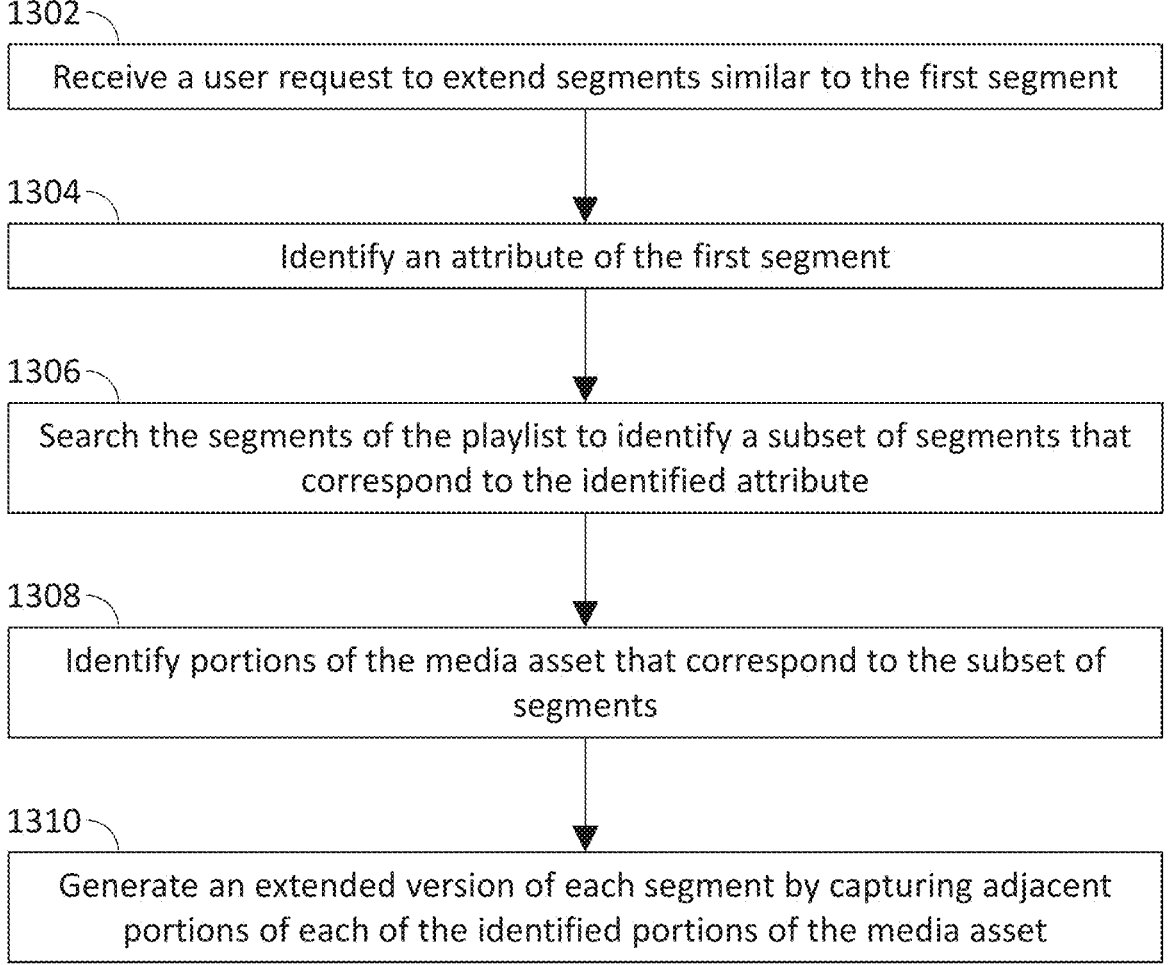

1302
Receive a user request to extend segments similar to the first segment

1304
Identify an attribute of the first segment

1306
Search the segments of the playlist to identify a subset of segments that correspond to the identified attribute 1308
Identify portions of the media asset that correspond to the subset of segments 1310
Generate an extended version of each segment by capturing adjacent portions of each of the identified portions of the media asset

FIG. 13

SYSTEMS AND METHODS FOR DYNAMICALLY EXTENDING OR SHORTENING SEGMENTS IN A PLAYLIST

CROSS-REFERENCE TO RELATED APPLICATIONS

This application is a continuation of U.S. patent application Ser. No. 17/837,528, filed Jun. 10, 2022, which is a continuation of U.S. patent application Ser. No. 17/241,316, filed Apr. 27, 2021, (now U.S. Pat. No. 11,388,488), which is a continuation of U.S. patent application Ser. No. 15/823,115, filed Nov. 27, 2017, (now U.S. Pat. No. 11,025,998), the disclosures of each application are incorporated by reference in their entireties.

BACKGROUND

Highlights of media assets include exciting or climactic portion of the event featured in the media asset. Highlights of media assets may not all be of the same level interest to a user. Some highlights may be more exciting than others. Other highlights may involve people or entities about which the user has little to no interest. Yet other highlights may contain portions of high interest to the user, and portions of lower interest to the user. Highlights may include a specific event or portion of a media asset. The user may be interested in the preceding or following portion of the media asset, for example to establish the context of the highlight. Traditional systems for generating viewing highlight playlists generate static playlists, wherein the length or content of each segment cannot be dynamically altered, and do not provide a mechanism to give the user more information for a particular highlight. This leaves the user only the option to manually search for the information, resulting in inefficiencies and wasted resources.

SUMMARY

Systems and methods are disclosed herein for dynamically modifying a playlist of highlights from a media event. For example, a user may wish to view highlights from a football game. The user may select the football game from an on-screen menu, such as an interactive program guide. When the user selects the football game, the media guidance application may access a media asset featuring the selected football game, and generate a number of segments representing highlights from the game. The segments may include touchdowns, field goals, completed passes, fumbles, interceptions, and other plays that may be noteworthy or essential to follow the development of the game. The media guidance application may then begin playing the segments sequentially, in the order in which they appear in the media asset. While watching a segment, the user may wish to see more of the play featured in the segment. The user may request, using a remote control, to extend the segment to include more of the game. The user may request that the segment be extended by a total of two minutes. The media guidance application may access the media asset at a position corresponding to the segment, and generate a new segment beginning from a position one minute prior to the beginning segment and ending one minute following the end of the segment. The media guidance application may then replace the segment with the extended segment, and begin playing the extending segment.

A playlist including segments of a media event may be generated by a media guidance application, each segment representing a highlight of the event. While the playlist is being played, if a user command is received by the media guidance application to lengthen the currently-playing segment of the playlist, the media guidance application may access the media asset from which the playlist was generated at a position corresponding to the currently-playing segment, and generate a longer version of the segment. If a user command is received by the media guidance application to shorten the currently-playing segment of the playlist, the media guidance application may remove a portion of the segment from the currently-playing segment or remove the segment in its entirety. The media guidance application may replace the currently-playing segment with, and begin playing back, the longer or shorter version of the segment.

As an example, while accessing a playlist including segments (e.g., highlights) from a sporting event (e.g., a football game), a user may wish to view a portion of the game leading up to an event (e.g., the play) featured in the segment. The user may, using a remote control, voice command or other input device, instruct the media guidance application to extend the currently-playing segment. The media guidance application may identify a time in the sporting event (e.g., football game) corresponding to the currently-playing segment, and access the media asset corresponding to the sporting event at the identified time. The media guidance application may generate from the media asset a version of the segment containing a portion of the media asset preceding and/or following the currently-playing segment. The media guidance application may replace the currently-playing segment with the newly-generated extended segment, and automatically begin playing back the extended segment.

In some aspects, a media guidance application may receive user input identifying an event for which the user wishes to view highlights. For example, the user may select an event from an interactive program guide that was previously broadcast. The media guidance application may identify a media asset featuring the identified event. For example, the media guidance application may access the program guide data relating to the selected event. The program guide data may be stored locally or on a remote server. The program guide data may identify a particular media asset via a program identifier, program listing, title, database entry, or other unique identification from which the media guidance application may locate the media asset. The media guidance application may access the media asset corresponding to the selected event and generate from the media asset a playlist comprising a plurality of segments, each representing a different highlight of the event. A highlight may be an important or exciting portion of the event. For example, the event may be a sporting event, such as a football game. Highlights of the football game may include scoring events such as touchdowns and field goals, and exciting events such as interceptions. As another example, the event may be an episode of a program series, such as "Game of Thrones." Highlights of "Game of Thrones" may include the deaths of major characters, and major plot points in the overall story arcs of each character.

While a first segment is being played back, the media guidance application may receive a user request to extend the first segment featuring the highlight. For example, the first segment may be a touchdown in a football game, but may not include the entirety of the play that resulted in the touchdown. The user may therefore wish to see what happened earlier in the play. As another example, the first segment may be the climactic portion of the Red Wedding scene in the episode of the program series "Game of Thrones," but the user may wish to see the entire Red Wedding scene. The user request to extend the first segment may be made via a dedicated button on a user interface device, or selection of an on-screen menu option. In response to receiving the user request, the media guidance application may determine a starting play position and an ending play position within the media asset that corresponds to the first segment. The media guidance application may determine the starting and ending play positions from information associated with the first segment, such as metadata. The starting play position may represent an amount of time from the beginning of the media asset. The ending play position may also represent an amount of time from the beginning of the media asset, or may represent an amount of time from the starting play position (i.e., the duration of the first segment). For example, the first segment may include information, such as metadata, indicating a starting play position corresponding to ten minutes and fifteen seconds from the start of the media asset, and an ending play position corresponding to twelve minutes and five seconds from the start of the media asset. Alternatively or additionally, the first segment may include information, such as metadata, indicating the duration of the segment is one minute and fifty seconds.

Based on the determined starting and ending play positions, the media guidance application may access the media asset corresponding to the event and generate an extended version of the first segment by capturing a portion of the media asset starting from a first play position that precedes the starting play position and ending at a second play position that follows the ending play position. For example, the starting play position may correspond to ten minutes and fifteen seconds from the beginning of the media asset, and the ending play position may correspond to twelve minutes and five seconds from the beginning of the media asset, or one minute and fifty seconds from the starting play position. The media guidance application may access the first media asset and capture a portion of the media asset beginning from eight minutes and fifteen seconds from the beginning of the media asset and ending at fourteen minutes and five seconds from the beginning of the media asset, thereby capturing an additional two minutes of the media asset before and after the first segment. For example, the first segment represents a touchdown in a football game. The media guidance application may access the media asset corresponding to the football game and capture the play or plays leading up to the touchdown, and the play or plays following the touchdown, such as a field goal attempt. As another example, the first segment may be the death of an important character in an episode of the program series "Game of Thrones." The media guidance application may access the media asset corresponding to the episode of the program series "Game of Thrones" from which the segment was taken, and capture an additional portion of the episode, such as another character's monologue or conversation prior to the death scene, and reactions from other characters to, or repercussions from the death of the character.

The amount of time added to each segment may be the same for each segment, such as adding a total of two minutes, one minute preceding the beginning of the segment, and one minute following the end of the segment, to each segment selected by the user to be extended. Alternatively, the amount of time added to each segment may be determined based on the type of content featured in the segment. For example, a segment featuring a touchdown may be extended by two minutes, while a segment featuring a completed pass may only be extended by one minute.

The media guidance application may replace the first segment with the extended version of the first segment, and begin playing back the first playlist starting from the beginning of the extended version of the first segment. Playback of the extended segment ay commence automatically in response to receiving the request to extend the segment. For example, the media guidance application may replace the first segment showing only a touchdown with the extended segment showing the play or plays before and after the touchdown. The media guidance application may begin playing the extended segment from the beginning of the extended segment so that the user can see the portion that led up to the touchdown. As another example, the media guidance application may replace the first segment showing the death of an important character in an episode of the program series "Game of Thrones" with an extended segment showing character interactions and dialogue before and after the death of the character. The media guidance application may begin playing the extended segment from the beginning of the extended segment so that the user can see the entire scene or scenes in order.

In some embodiments, the media guidance application may receive a user request to shorten the segment featuring the highlight. For example, the segment may contain portions of the event that are of less interest to the user, such as a football paly in which the quarterback is sacked, or a scene in an episode of the program series "Game of Thrones" containing a long monologue. In response to receiving the user request to shorten the segment, the media guidance application may generate a shortened version of the segment by removing a portion of the second segment. The media guidance application may also store the current play position of the segment at the time the shortening request was received. The media guidance application may temporarily copy the second segment into memory in order to modify the segment. The media guidance application may replace the segment in the playlist with the shortened version of the second segment temporarily stored in memory, and begin playing back the first playlist starting from a position in the shortened version of the segment corresponding to the stored play position of the segment at the time the user request to shorten the segment was received.

In some embodiments, in response to receiving the user request to extend the segment, the media guidance application may generate for display a plurality of extending options. For example, one of the extending options may specify an amount of time by which to extend the current segment. Another of the extending options may specify an amount of time by which to extend similar segments to the current segment. A third option may specify an amount of time by which to extend all segments of the event, and a fourth option may be to obtain a full version of the event.

In some embodiments, in response to receiving the user request to shorten the segment, the media guidance application may generate for display a plurality of shortening options. For example, one of the shortening options may specify a first amount time by which to shorten the segment. Another of the shortening options may specifying an amount of time by which to shorten similar segments to the current segment. A third option may specify an amount of time by which to shorten all segments of the event.

In some embodiments, the media guidance application may receive the request to extend the segment from a user input device when a user presses a dedicated extension button on the user input device. For example, a remote control associated with the user equipment on which the media guidance application resides may contain an "Extend"

button. Upon pressing the "Extend" button, the remote control may transmit a signal to the user equipment comprising a request to expand the current segment, which may be processed by the media guidance application. The media guidance application may similarly receive the request to shorten the segment from a user input device when a user presses a dedicated shortening button on the user input device. For example, a remote control associated with the user equipment on which the media guidance application resides may contain a "Shorten" button. Upon pressing the "Shorten" button, the remote control may transmit a signal to the user equipment comprising a request to shorten the current segment, which may be processed by the media guidance application.

In some embodiments, the media guidance application may determine the information identifying a starting and ending play position of the segment by capturing a first frame of the segment. For example, the media guidance application may include a video processing module capable of isolating a single still frame from a video stream. The media guidance application may identify the media asset featuring the event as described above, and search images of frames of the media asset to locate an image that matches the isolated still frame of the media asset. For example, the media guidance application may store locally a database of still frame images extracted from the media asset. As another example, the media guidance application may access a database of still frame images extracted from the media asset located on a remote server via an Internet connection. The media guidance application may include an image recognition module which may compare the captured still frame image of the media asset with the images stored in the database to determine which image matches the isolated still frame image. In some embodiments, the database includes at least one representative image extracted from each segment.

In some embodiments, the media guidance application may generate a second playlist of segments comprising a second plurality of segments each representing a highlight of the event corresponding to the segments of the first playlist. Each segment of the second playlist may be an extended version of the corresponding segment in the first playlist. In response to a user request to extend the current segment, the media guidance application may access the second playlist and begin playing the corresponding extended segment.

In some embodiments, the media guidance application may generate a second playlist of segments comprising a second plurality of segments each representing a highlight of the event corresponding to the segments of the first playlist. Each segment of the second playlist may be a shortened version of the corresponding segment in the first playlist.

In some embodiments, the second playlist may be generated based on a user selection. For example, the media guidance application may receive a user selection to add or remove a certain amount of time to a given segment, and may generate a second playlist in which all segments are longer or shorter than the corresponding segments in the first playlist by the selected amount of time. Alternatively, the media guidance application may generate a second playlist automatically, with each segment expanded or shortened by an amount determined by the media guidance application based on a user profile or user-related information. For example, the media guidance application may access a user profile for the user and determine that the user is more interested in touchdown plays than in any other part of a football game, and may generate the second playlist to include extended version of the touchdown segments, while extending other segments to a lesser degree, or not at all.

In some embodiments, the media guidance application may determine an amount of time associated with the user request to extend the segment. For example, the user request to extend the segment may include an amount of time, such as two minutes. Alternatively, the media guidance application may be configured to detect multiple presses of a dedicated "Extend" button on a user input device such as a remote control. If the "Extend" button is pressed multiple times within a certain period of time, the media guidance application may increase the amount of time associated with the request in accordance with the detected number of times the "Extend" button is pressed. As another alternative, the amount of time by which the segment may be extended may be predetermined. For example, the media guidance application may be configured with a predetermined value for the amount by which to extend a segment. The media guidance application may generate the extended version of the segment by capturing the portion of the media asset starting from the first play position that precedes the starting play position by half of the amount of time associated with the request, and ending at a second play position that follows the ending play position by half of the amount. For example, if the user request to extend the current segment has an associated amount of time of four minutes, the media guidance application with access the media asset at a position corresponding to the current segment and capture the portion of the media asset beginning two minutes before the start position of the current segment an ending two minutes after the end position of the current segment, adding a total of four minutes to the segment.

In some embodiments, the user request may be to extend the current segment and all similar segments. The media guidance application may identify an attribute of the current segment. For example, the current segment may be a touchdown segment in a football game. The media guidance application may, using a video processing module, analyze the content of the segment to determine the type of event that occurs in the segment, the team or player involved in the segment, or any other elements of the segment that may be contained in other segments. The media guidance application may search the segments of the playlist to identify which segments correspond to the identified attribute. For example, the media guidance application may process each segment to determine if any of the segments also contain touchdowns by the same team. The media guidance application may create an index or database of elements in each segment. The media guidance application may compare the elements of the current segment with those of all other segments in the playlist to identify segments with similar elements. In some embodiments, the media guidance application may request user input to clarify which element or elements of the current segment are to be considered for identifying other segments as similar, such as which team or player the user is interested in, or which part of the featured play the user is interested in. The media guidance application may identify portions of the media asset corresponding to the subset of the segments determined to be similar and capture adjacent portions of each of the identified portions of the media asset to generate extended versions of each of the identified portions.

In some embodiments, the event comprises a sporting event. The attribute used by the media guidance application to determine similar segments may be a scoring event in the sporting event. For example, the event may be a football game. Some segments may include touchdowns or field goals, while other segments may include fumbles, interceptions, or other non-scoring events. The media guidance application may determine that all segments representing a clip of a touchdown or field goal should be extended. For example, the current segment may be a segment including a touchdown. The user request to extend similar segments may result in extending all segments containing touchdowns or field goals, as both are scoring events.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 7 is a flowchart representing an illustrative process for dynamically modifying a playlist for reviewing highlights of an event by extending a segment in accordance with some embodiments of the disclosure;

FIG. 9 is a flowchart representing an illustrative process for determining information associated with the first segment that identifies a starting play position and an ending play position within a media asset according to some embodiments of the disclosure;

FIG. 10 is a flowchart representing an illustrative process for generating a playlist of extended segments and playing back an extended segment according to some embodiments of the disclosure;

FIG. 11 is a flowchart representing an illustrative process for generating a playlist of shortened segments according to some embodiments of the disclosure;

FIG. 12 is a flowchart representing an illustrative process for generating an extended version of a segment based on an amount of time associated with a request to extend the segment according to some embodiments of the disclosure; and FIG. 13 is a flowchart representing an illustrative process for generating extended versions of similar segments according to an embodiment of the disclosure.

DETAILED DESCRIPTION

Systems and methods are disclosed herein for dynamically modifying a playlist of highlights from a media event. For example, a user may wish to view highlights from a football game. The user may select the football game from an on-screen menu, such as an interactive program guide. When the user selects the football game, the media guidance application may access a media asset featuring the selected football game, and generate a number of segments representing highlights from the game. The segments may include touchdowns, field goals, completed passes, fumbles, interceptions, and other plays that may be noteworthy or essential to follow the development of the game. The media guidance application may then begin playing the segments sequentially, in the order in which they appear in the media asset. While watching a segment, the user may wish to see more of the play featured in the segment. The user may request, using a remote control, to extend the segment to include more of the game. The user may request that the segment be extended by a total of two minutes. The media guidance application may access the media asset at a position corresponding to the segment, and generate a new segment beginning from a position one minute prior to the beginning segment and ending one minute following the end of the segment. The media guidance application may then replace the segment with the extended segment, and begin playing the extending segment.

Figure 1:
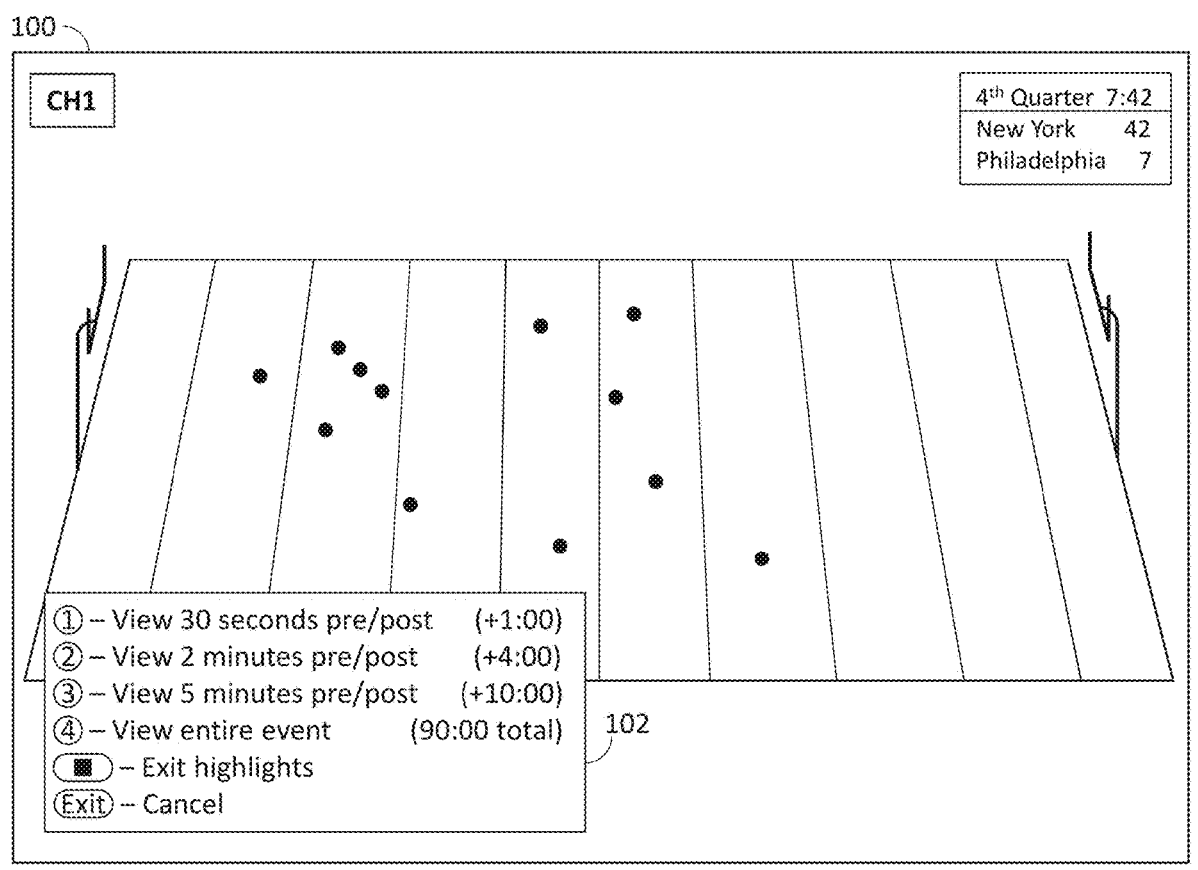
FIG. 1 shows an exemplary display screen and exemplary menu overlays providing options for extending or shortening segments in accordance with some embodiments of the disclosure.

FIG. 1 shows an exemplary display screen and exemplary menu overlays providing options for extending or shortening segments in accordance with some embodiments of the disclosure. A media guidance application may generate a highlight playlist from a media asset. The playlist may comprise a plurality of segments, each segment representing a different highlight of the media asset. In some embodiments, the media guidance application may generate a plurality of playlists, each playlist comprising segments representing the same set of highlights of the media asset, with the segments of each playlist being of longer or shorter duration than corresponding segments in a different playlist. In other words, the media guidance application may generate a playlist of short segments, and a playlist of long segments, where each short segment in the playlist of short segments has a corresponding long segment in the playlist of long segments, representing the same highlight.

While generating for display a given segment of the highlight playlist, the media guidance application may receive a command from a user input device to extend or shorten the given segment. In response to receiving the command, the media guidance application may generate for display on display screen 100 a menu, such as menu 102, menu 104, menu 106, menu 108, menu 110, menu 112, or menu 114 in an overlay over the currently playing segment of the highlight playlist. The menu may include options for extending or shortening the currently playing segment, the options being appropriate for the received command. In other words, if the media guidance application receives a command to extend the currently playing segment, the menu option generated for display may include options for extending the segment (e.g., menu 102), and if the media guidance application receives a command to shorten the currently playing segment, the menu options generated for display may include options to shorten the segment (e.g., menu 104, menu 108). In some embodiments, the media guidance application may receive a command to modify the length of the segment without specifying whether to extend or shorten the segment. In response to such command, the media guidance application may generate for display a menu including options for both extending and shortening the segment (e.g., menu 106, or menu 110).

The media guidance application may generate for display a playlist of highlights from a media asset or event. A playlist of highlights should be understood to mean a sequence of segments that represents a series of portions of a media asset that is less than an entirety of the media asset, each segment being the same or different in length, that are automatically played in sequence one after the other when the user requests to play the playlist. For example, the media guidance application may generate a playlist of highlights from a football game, or series of football games. The media guidance application may access a media asset corresponding to football game, or a plurality of media assets corresponding to the series of football games, and generate a plurality of segments representing different portions of each football game, such as each time a team scores a touchdown. As another example, the media guidance application may generate a playlist of highlights from a movie or entertainment program, such as the program series "Game of Thrones." The media guidance application may access a media asset corresponding to an episode of the program series "Game of Thrones," or a plurality of media assets corresponding to multiple episodes, and generate a plurality of segments representing different portions of each episode, such as each time an important character is killed.

While generating for display a given segment of the playlist, the media guidance application may receive an "extend" or "shorten" command from a user input device, such as a remote control, smartphone, tablet, personal computer, voice command, or other suitable device. The command may be received from the user input device via radio frequency, infrared, IEEE 802.11a, b, g, and/or n ("WiFi"), Bluetooth, or any other suitable transmission protocol. In response to an "extend" command, the media guidance application may generate for display, for example, menu 102. Menu 102 may include options for adding various amounts of time to the current segment. For example, a first option may add the thirty seconds preceding the segment to the beginning of the segment, and the thirty seconds following the segment to the end of the segment, for a total of one additional minute of content. A second option may add two minutes to each end of the segment, for a total of four additional minutes of content. A third option may add five minutes to each end of the segment, for a total of ten additional minutes of content. A fourth option may be to view the entirety of the media asset from which the current segment was generated. For example, if the playlist comprises segments from several football games, the fourth option may be to watch the entire game from which the current segment was taken. As another example, if the playlist comprises segments from an entire season of Game of Thrones, the fourth option may be to watch the entire episode from which the current segment was taken. Menu 102 may also include an indication of how to select each option, such as images, glyphs, icons, or text representing buttons on the user input device corresponding to each of the menu options. For example, the option to add thirty seconds to the beginning and end of the current segment may be selected by pressing the "1" key on a user input device, the option to add two minutes to the beginning and end of the current segment may be selected by pressing the "2" key on a user input device, the option to add five minutes to the beginning and end of the current segment may be selected by pressing the "3" key on a user input device, and the option to view the entire media asset from which the current segment was taken may be selected by pressing the "4" key on a user input device. The selection of an option may also be received by a voice command. For example, the user may say "one" to select the option to add thirty seconds to the beginning and end of the current segment (i.e., the voice command may be a spoken equivalent of the indicated text, icon, image, or glyph associated with an option). Menu 102 may also include an indication of how much time each option will add to the current segment.

In response to receiving selection of an option from menu 102, the media guidance application may identify a position in the media asset corresponding to the beginning of the current segment, and a position in the media asset corresponding to the end of the current segment. Methods for identifying the positions in the media asset corresponding to the beginning and end of the current segment are described in detail below with reference to FIG. 8. The media guidance application may extend the current segment by the amount of time indicated by the selected option. For example, in response to receiving selection of the "View 30 second pre/post" option, the media guidance application may extract media data from the media asset beginning from a position corresponding to thirty seconds before the beginning of the current segment and ending thirty seconds after the end of the current segment, generating a new segment containing the extracted media data. In response to receiving selection of the "View 2 minutes pre/post" option, the media guidance application may extract media data from the media asset beginning from a position corresponding to one minute before the beginning of the current segment, and ending at a position corresponding to one minute after the current segment, generating a new segment containing the extracted media data. In response to receiving selection of the "View 5 minutes pre/post" option, the media guidance application may extract media data from the media asset beginning from a position corresponding to two minutes and thirty seconds before the beginning of the current segment and ending two minutes and thirty seconds after the end of the current segment, generating a new segment containing the extracted media data.

In response to receiving selection of the "View entire event" option, the media guidance application may access the media asset from which the current segment was extracted. In some cases, the entire playlist of highlights may have been extracted from a single media asset, such as a single football game, or single episode of the program series "Game of Thrones." In other cases, the playlist of highlights may include segments from multiple football games, or multiple episodes of the program series "Game of Thrones." The playlist of highlights may include metadata or other data structures indicating the media asset from which each segment was extracted. The media guidance application may access the metadata or other data structures of the playlist of highlights to determine the media asset from which the current segment was extracted. The media guidance application may search the playlist of highlights, the metadata, or other data structures of the playlist of highlights to identify all segments which were extracted from the same media asset as the current segment. The media guidance application may remove each identified segment from the playlist, and replace the current segment with the full media asset from which the current segment was extracted.

In some embodiments, rather than display a menu such as menu 102, the media guidance application may accept user input specifying the amount of time to add to the segment or segments. In some embodiments, in response to receiving selection of an option to extend a segment from a menu such as menu 102, the media guidance application may begin playing back a longer segment from a second playlist comprising longer segments, as described above. In some embodiments, the media guidance application may replace the currently playing segment in the playlist with a longer segment from a playlist comprising longer segments.

In response to a "shorten" command, the media guidance application may generate for display, for example, menu 104. Menu 104 may include an option to skip the current segment, such as the "Skip this highlight" option. In response to a user selection of this option, the media guidance application may begin playing back the next segment in the playlist. Menu 104 may include an option to skip similar segments, such as the "Skip similar highlights" option. In response to user selection of this option, the media guidance application may identify certain content characteristics of the current segment. For example, the media guidance application may include an image recognition module configured to extract and process still frames from a video. The media guidance application may identify, for example, a particular football player or team featured in the current segment, or a particular character from the program series "Game of Thrones." The media guidance application may contain an audio processing module configured to analyze the audio content of each segment and identify various audio elements such as music, sound effects, and dialogue. For example, the media guidance application may identify a particular musical theme associated with a certain character in an episode of the program series "Game of Thrones," or the voice of a certain character. The media guidance application may, alternatively or additionally, access a database of video and audio characteristics to determine the elements of the current segment to be used in determining if another segment is similar to the current segment. The database may be stored locally, or on a remote server. To access a remote server, the media guidance application may be configured to connect to a network, such as the Internet. The media guidance application may reside on a multimedia device (e.g., a set-top box). The device may include a network connection such as an Ethernet port or an IEEE 802.11a, b, g, and/or n ("WiFi") module. Menu 104 may also include an option to skip all segments from media asset from which the current segment was taken, such as the "Skip all from this event" option. In response to selection of this option, the media guidance application may access the metadata or other data structures of the playlist of highlights to identify the media asset from which the current segment was taken, and further identify all segments in the playlist that were taken from the identified media asset. The media guidance application may remove all identified segments from the playlist and continue playback from the beginning of the next available segment.

In response to the "shorten" command, the media guidance application may alternatively generate for display, for example, menu 106. Menu 106 may include an option to shorten the current segment, such as the "Shorten this highlight" option. In response to selection of this option, the media guidance application may remove a portion of the segment. In some embodiments, the media guidance application may determine which portion to remove by analyzing the video and audio content to identify portions of the segment that are of lower importance. For example, a segment from a football game may include a huddle prior to the play, or a call for a time out. The media guidance application may determine that these portions are of less importance than the rest of the segment, and remove those portions. As another example, a segment from the program series "Game of Thrones" may include a long landscape shot prior to the primary action or dialogue of the segment. The media guidance application may determine that this portion of the segment is less important and remove it.

Menu 106 may include an option to shorten all segments that are similar to the current segment, such as the "Shorten similar segments" option. The media guidance application may identify similar segments to the current segment, as described above. The media guidance application may, as described above, determine what portions are of less importance. The media guidance application may remove portions of each identified segment that are of less importance than the rest of each respective segment.

Menu 106 may include an option to shorten all segments that are taken from the same media asset as the current segment, such as the "Shorten all from this event" option. As described above, the media guidance application may determine which segments were taken from the same media asset. As described above, the media guidance application may analyze each segment and determine which portion of each segment is less important than the rest of the segment. The media guidance application may remove the less important portion of each segment taken from the media asset.

In response to the "shorten" command, the media guidance application may alternatively generate for display, for example, menu 108. Menu 108 may include options from both menu 104 and menu 106. This menu allows a user to choose to shorten or skip a segment from a single menu.

In some embodiments, rather than display a menu such as menu 102, menu 104, menu 106, or menu 108, the media guidance application may accept user input, from a user input device, or voice command, specifying the amount of time to add to or remove from the segment or segments. In some embodiments, in response to receiving selection of an option to extend or shorten a segment from a menu such as menu 102, menu 104, menu 106, or menu 108, the media guidance application may begin playing back a longer or shorter segment from a second playlist comprising longer or shorter segments, as described above. In some embodiments, the media guidance application may replace the currently playing segment in the playlist with a longer or shorter segment from a playlist comprising longer or shorter segments.

In some embodiments, the media guidance application may receive a command to modify the current segment or playlist which does not specify whether to extend or shorten the segment or playlist. In response to this command, the media guidance application may generate for display, for example, menu 110, which may include options for extending segments, as described above with reference to menu 102, and options for skipping segments, as described above with reference to menu 104. Alternatively, the media guidance application may generate for display, for example, menu 112, which may include options for extending segments, as described above with reference to menu 102, and options for shortening segments, as described above with reference to menu 106. As another alternative, the media guidance application may generate for display, for example, menu 114, which may include options for extending segments, as described about with reference to menu 102, option for skipping segments, as described above with reference to menu 104, and options for shortening segments, as described above with reference to menu 106.

Each of the exemplary menus described above may also include an "exit highlights" option. The "exit highlights" option may be selected by pressing a "stop" button (e.g., button 216 (FIG. 2)) on a user input device, or by a voice command (e.g., a user may say "stop"). In response to selection of the "exit highlights" option, the media guidance application may stop the playback of the playlist. Each of the menus may also include a "cancel" option. The "cancel" option may be selected by pressing an "exit" button (e.g., button 204 (FIG. 2)) on a user input device, or by a voice command (e.g., a user may say "cancel"). In response to selection of the "cancel" option, the media guidance application may discontinue generating the menu for display.

Figure 2:
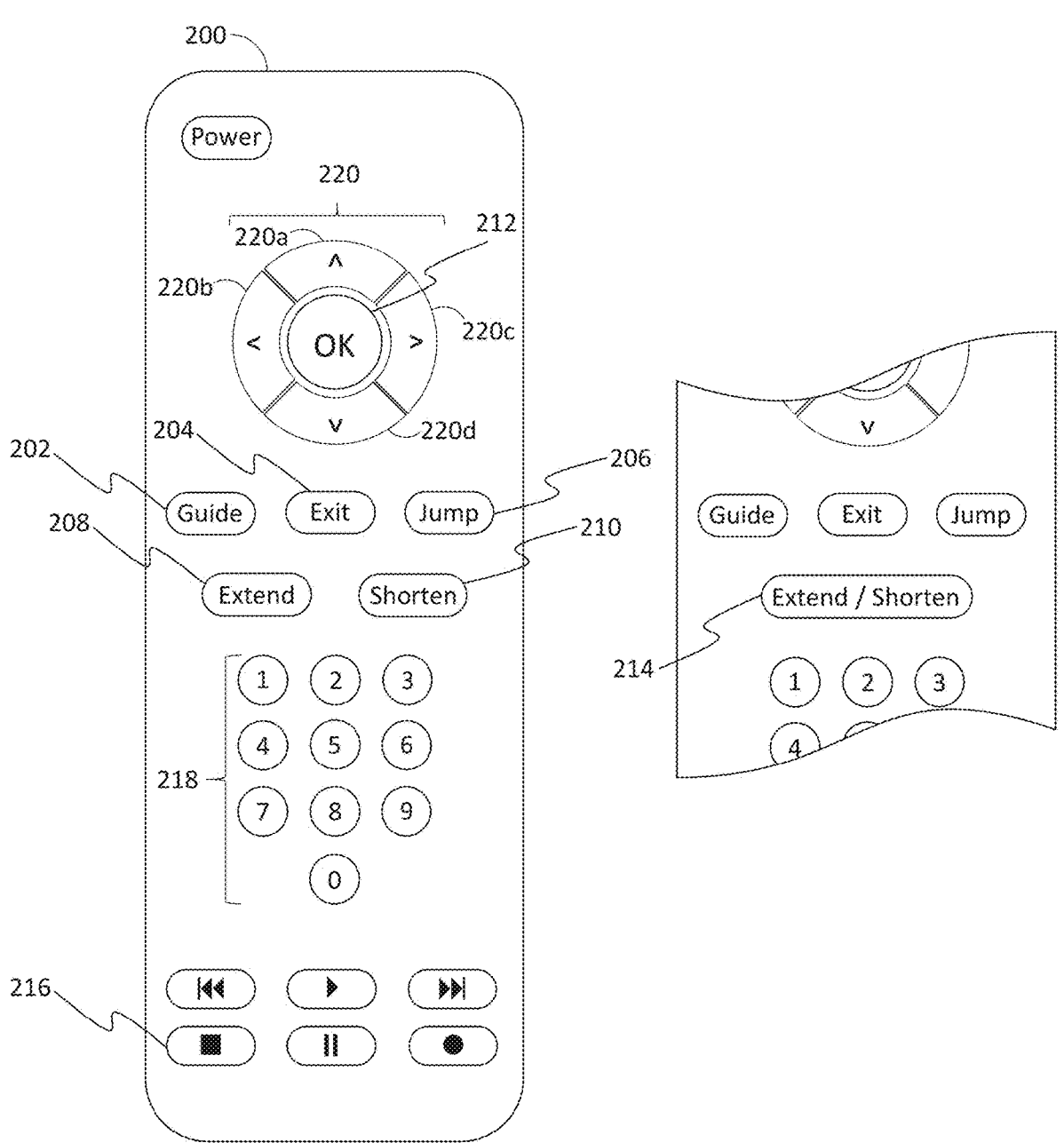
FIG. 2 shows an exemplary user input device including dedicated "Extend" and "Shorten" buttons in accordance with some embodiments of the disclosure.

FIG. 2 shows an exemplary user input device including dedicated "Extend" and "Shorten" buttons in accordance with some embodiments of the disclosure. User input device 200 is an illustrative user input device in the form of a remote control. However, other user input devices may be used, such as smartphones, tablets, personal computers, or any other device capable of transmitting commands recognized by the media guidance application. The user input device 200 may include a dedicated "Guide" button 202 for accessing a program guide. For example, a user may press the "Guide" button 202, which may cause the user input device 200 to transmit a command to the media guidance application to display a program guide. In response to receiving the command to display a program guide, the media guidance application may generate for display a program guide, such as the exemplary program guide shown in FIG. 3, and described in detail below in relation thereto.

The user input device 200 may include a dedicated "Exit" button 204 for exiting a program guide and other on-screen menus generated for display by the media guidance application. For example, while an on-screen menu or program guide is being generated for display by the media guidance application, a user may press "Exit" button 204, which may cause the user input device 200 to transmit an exit command to the media guidance application. In response to receiving the exit command, the media guidance application may discontinue generating the on-screen menu or program guide for display.

The user input device 200 may include a dedicated "Jump" button 206 for "jumping" or returning to the last-tuned media asset prior to the currently-playing media asset. For example, while watching a first media asset, the user may tune to or otherwise select a second media asset to watch. The media guidance application may record or otherwise store the identity, source, and/or any other identifying information relating to the first media asset. While watching the second media asset, the user may wish to return to the first media asset. The user may press the "Jump" button 206, which may cause the user input device 200 to transmit a command to the media guidance application to return to the first media asset. In response to receiving the command to return to the first media asset, the media guidance application may, using the stored identifying information of the first media asset, return to the first media asset. The media guidance application may record or otherwise store similar identifying information relating to the second media asset. In response to receiving another "jump" command from the user input device, the media guidance application may, using the stored information, return to the second media asset, and may again store identifying information relating to the first media asset.

The user input device 200 may include directional buttons 220 and an "OK" button 212 for selecting options displayed in an on-screen menu generated for display by the media guidance application. For example, while an on-screen menu is being generated for display, the user may press any of an "Up" button 220a, a "Left" button 220b, a "Right" button 220c, and a "Down" button 220d to navigate between different options or items of the on-screen menu. For example, pressing any of directional buttons 220 may cause user input device 200 to transmit a corresponding signal to the media guidance application to move a cursor in the corresponding direction. Once the user navigates to the desired option, the user may press "OK" button 212 to select the option, which may cause the user input device 200 to transmit a signal the media guidance application to execute the function associated with the selected option. As another example, while a program guide is being generated for display, such as the program guide described below in relation to FIG. 3, the user may press any of "Up" button 220a, "Left" button 220b, "Right" button 220c, and "Down" button 220d to navigate between different media assets represented in the program guide. For example, pressing an of directional button 220 may cause user input device 200 to transmit a corresponding signal to the media guidance application to move a cursor in the corresponding direction. Once the user navigates to the desired media asset, the user may press "OK" button 212, which may cause user input device 200 to transmit a signal to the media guidance application to tune to or otherwise access the selected media asset.

The user input device 200 may also include an "Extend" button 208 and a "Shorten" button 210. When a user presses the "Extend" button 208, the user input device 200 may transmit a command to the media guidance application to extend to the current segment, as described above. When a user presses the "Shorten" button 210, the user input device 200 may transmit a command to the media guidance application to shorten the current segment, as described above. Alternatively, the user input device 200 may include an "Extend/Shorten" button 214 which, when pressed, may transmit a command to the media guidance application to modify the length of the current segment without specifying whether to extend or shorten the current segment, as described above.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 3:
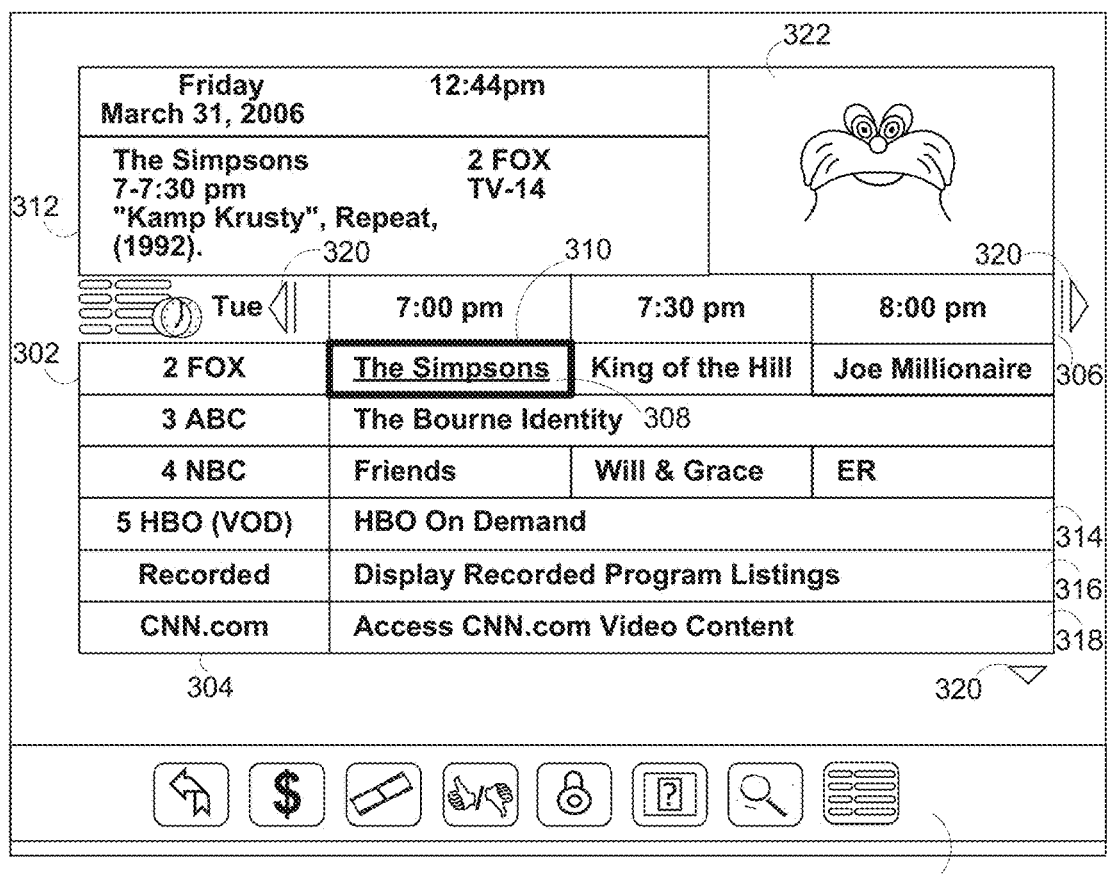
FIG. 3 shows an illustrative display screen that may be used to provide media guidance data in accordance with some embodiments of the disclosure.
Figure 4:
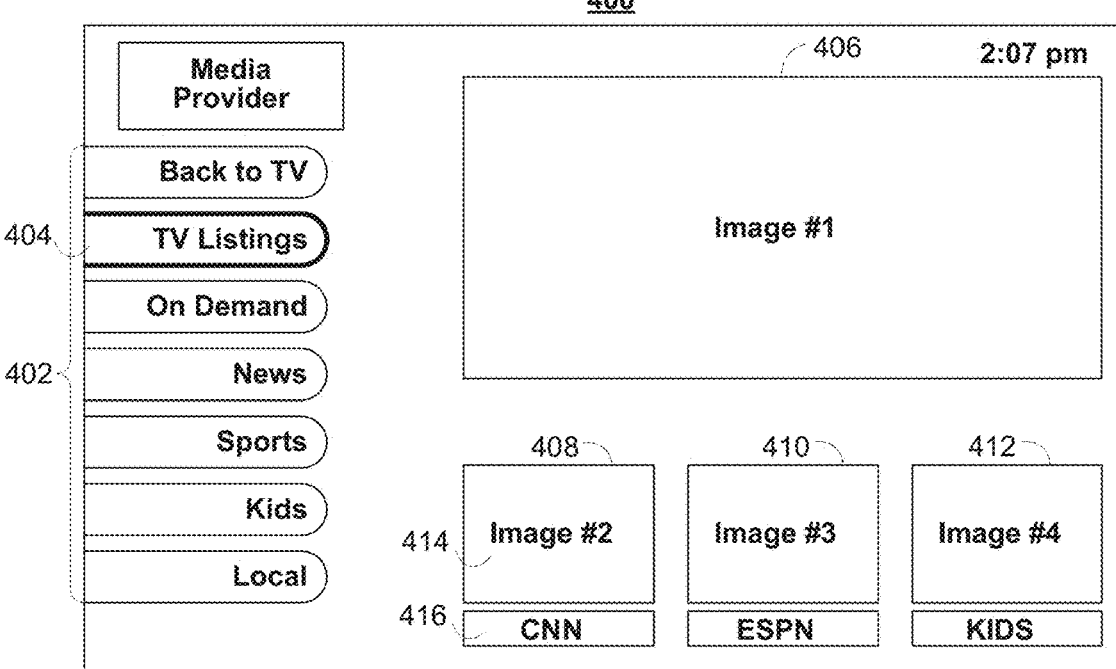
FIG. 4 shows an illustrative display screen that may be used to provide media guidance data in accordance with some embodiments of the disclosure.

FIGS. 3-4 show illustrative display screens that may be used to provide media guidance data. The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows illustrative grid of a program listings display 300 arranged by time and channel that also enables access to different types of content in a single display. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 326 may allow the user to access different types of content, media guidance application displays, and/ or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 5:
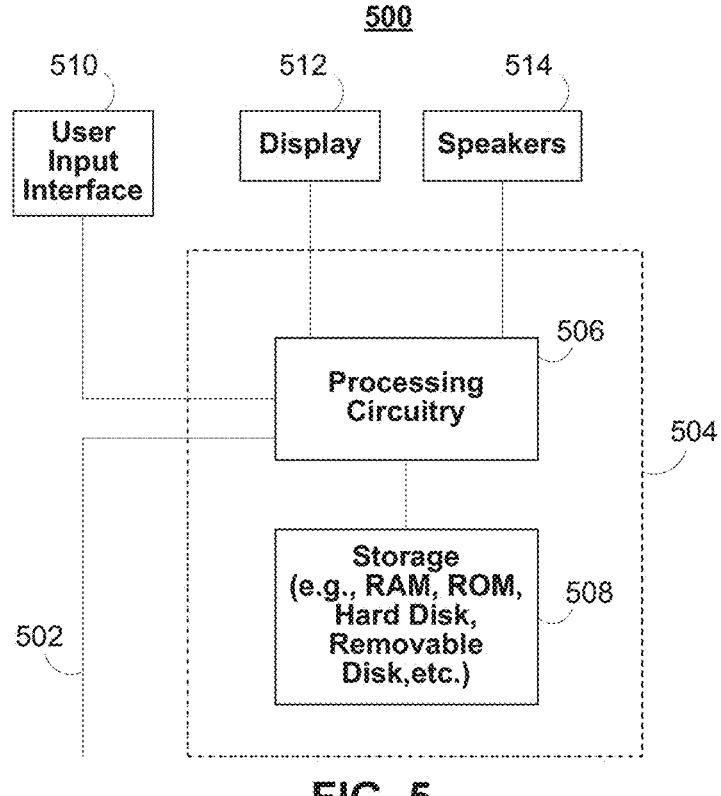
FIG. 5 shows a generalized embodiment of a stand-alone device in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
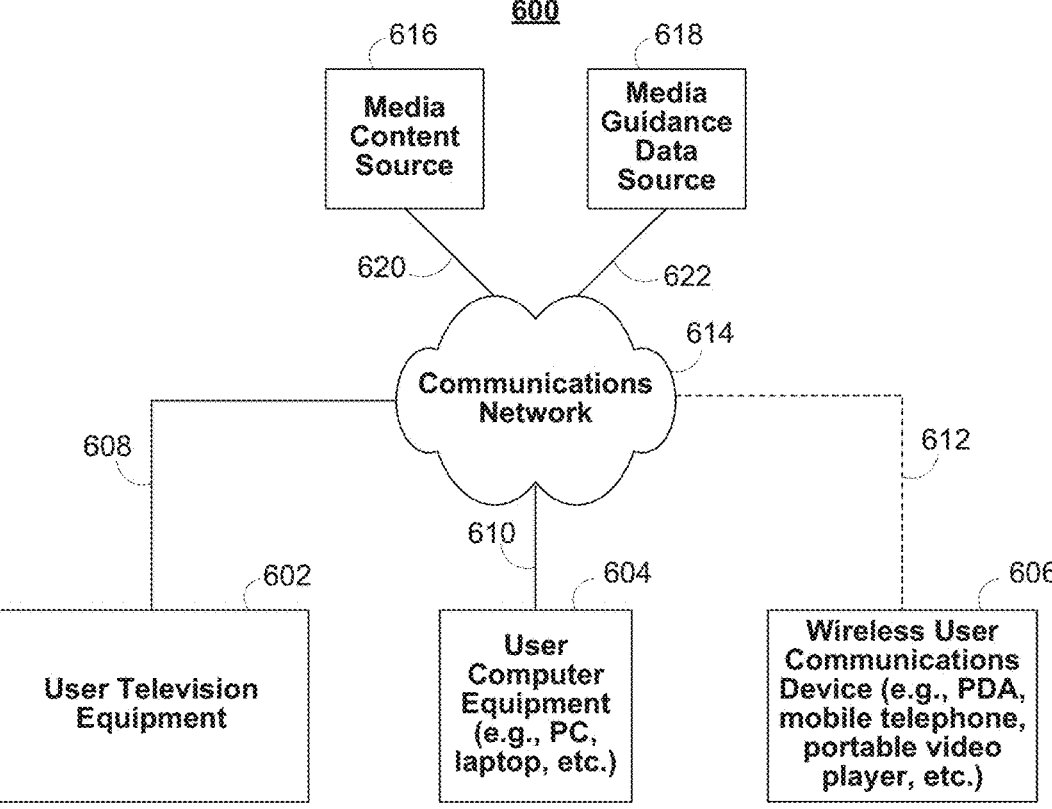
FIG. 6 shows a specific implementation of user devices in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 620 and 622 may include any of the communication paths described above in connection with paths 608, 610, and 612. Communications with the content source 616 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

FIG. 7 is a flowchart representing an illustrative process for dynamically modifying a playlist for reviewing highlights of an event by extending a segment in accordance with some embodiments of the disclosure. The flowchart in FIG. 7 represents a process 700 implemented on control circuitry 504 for dynamically modifying a playlist for reviewing highlights of an event by extending a segment according to an embodiment of the disclosure. It should be noted that process 700 or any action thereof could be performed on, or provided by, any of the devices shown in FIGS. 5-6. For example, process 700 may be executed by control circuitry 504 (FIG. 5) as instructed by a media guidance application implemented on a user device (e.g., user equipment devices 602, 604, and/or 606 (FIG. 6), as well as display screen 100 (FIG. 1)) in order to dynamically modify a playlist for reviewing highlights of an event by extending a segment. In addition, one or more actions of process 700 may be incorporated into or combined with one or more actions of any other process or embodiment described herein.

At 702, control circuitry 504 may receive user input identifying an event for which the user wished to view highlights. For example, a user may select, using "OK" button 212 of user input device 200, a media asset from grid 302. Control circuitry 504 may receive commands from user input device 200 via user input interface 510.

At 704, control circuitry 504 may generate a plurality of playlists, each comprising a plurality of segments, each segment representing a different highlight of the selected media asset. For example, upon receiving selection of a football game, control circuitry 504 may generate a first playlist of highlights including a plurality of segments, each segment representing a different highlight from the football game. Control circuitry 504 may also generate a second playlist of highlights including a plurality of segments, each segment having a corresponding segment in the first playlist, and each segment being of longer duration than the respective corresponding segment of the first playlist. For example, control circuitry 504 may generate a second playlist of highlights from the selected football game wherein each segment includes a portion of the football game immediately before and/or immediately following the portion included in the corresponding segment of the first playlist of highlights. For example, a first segment of the first playlist of highlights may represent the New York Giants running the ball toward the end zone and scoring a touchdown. The corresponding segment of the second playlist may represent the same touchdown, but may include the entire play from its beginning at the line of scrimmage and may also include, for example, a "touchdown dance" of the player who scored the touchdown. Control circuitry 504 may further generate a third playlist of highlights including a plurality of segments, each segment having a corresponding segment in the first playlist of highlights, and each segment being of shorter duration than the respective corresponding segment of the first playlist of highlights. For example, a segment of the third playlist of highlights corresponding to the first segment of the first playlist of highlights described above may omit a portion of the run toward the end zone, and include only the last few yards of the run before the touchdown. Control circuitry 504 may generate any number of playlists of highlights, each including extended or shortened segments relative to the segments of the first playlist of highlights, each playlist of highlights comprising segments which are extended or shortened by a different amount of time.

At 706, control circuitry 504 may access a first playlist of highlights that includes a first plurality of segments, each segment representing a different highlight of media asset. Control circuitry 504 may process the data of each segment for display on a user equipment device (e.g., user equipment 602, 604, 606 and display screen 100).

At 708, while a given segment of the first playlist is being displayed, control circuitry 504 may receive from a user input device, such as user input device 200, via user input interface 510, a user request for extending or shortening the segment being played back. For example, a user may press "Extend" button 208, "Shorten" button 210, or "Extend/Shorten" button 214 of user input device 200, causing transmission of a corresponding request to extend or shorten the segment from the user input device 200 to control circuitry 504 via user input interface 510.

At 710, based on the request received from user input interface 510, control circuitry 504 may access a second playlist of highlights having an extended or shortened version of the segment being played back. For example, if control circuitry 504 receives a request to extend the segment currently being played back, control circuitry 504 may access a playlist of highlights including segments of longer duration. The received request may indicate the amount of time by which to extend the segment, such as "View 30 seconds pre/post" option of menu 102, menu 110, menu 112, or menu 114. Control circuitry 504 may compare the length of the corresponding segment in each playlist of highlights with the length of the segment currently being played back to determine which playlist comprises segments extended by the requested amount of time. If control circuitry 504 receives a request to shorten the segment currently being played back, control circuitry 504 may access a playlist of highlights including segments of shorter duration. The received request may indicate the amount of time by which to shorten the segment. Control circuitry 504 may compare the length of the corresponding segment in each playlist with the length of the segment currently being played back to determine which playlist of highlights includes segments shortened by the requested amount of time.

At 712, control circuitry 504 may play back the second playlist of highlights starting from the shortened or extended version of the segment currently being played back. For example, the segment currently being played back may represent the Red Wedding scene from an episode of the program series "Game of Thrones." Upon receiving a user request to extend the segment, control circuitry 504 accesses a second playlist of highlights having an extended version of the Red Wedding scene, and may switch playback from the first playlist of highlights to the second playlist of highlights, beginning from the extended version of the Red Wedding scene.

It is contemplated that the actions or descriptions of FIG. 7 may be used with any other embodiment of this disclosure. In addition, the actions and descriptions described in relation to FIG. 7 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 5-6 could be used to perform one or more of the actions in FIG. 7.

Figure 8:
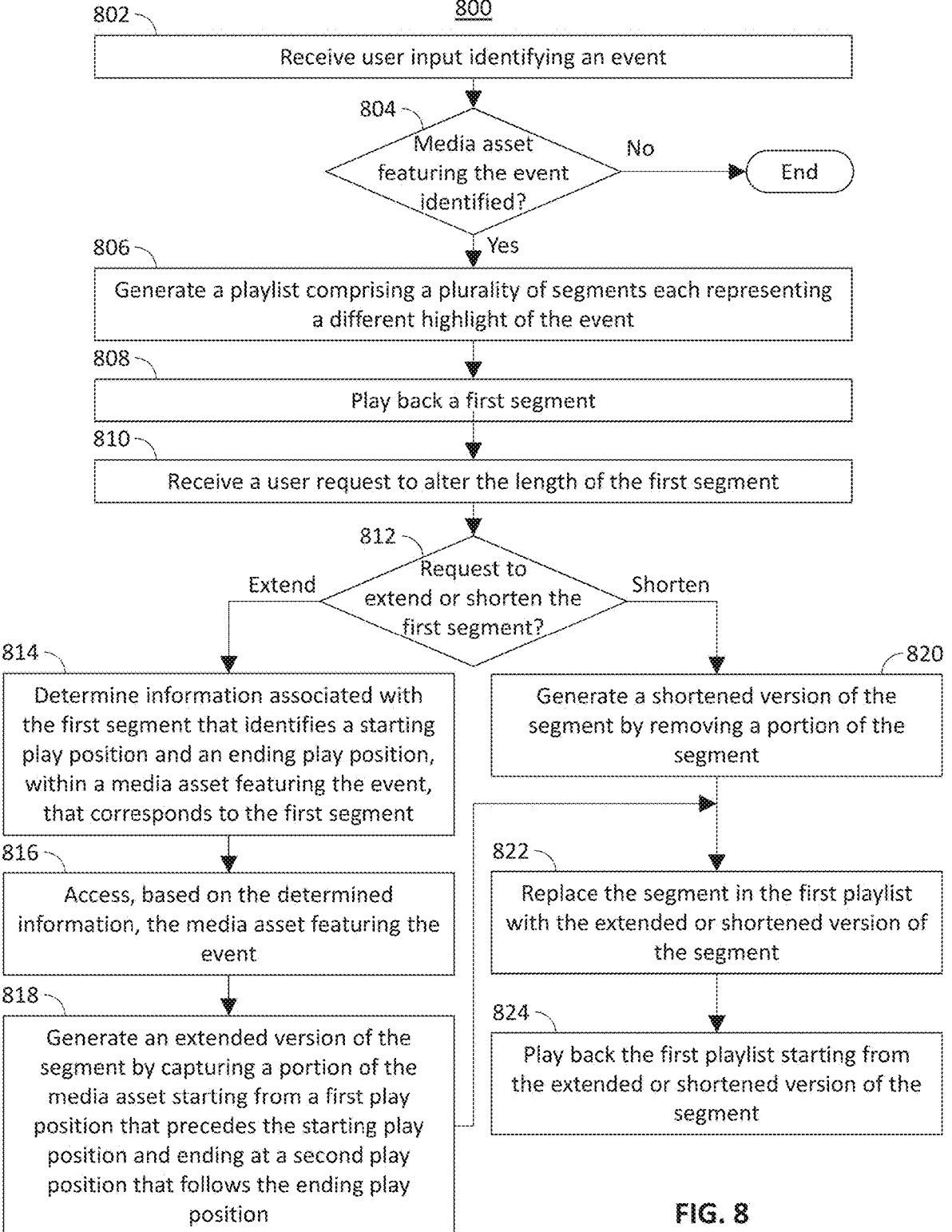
FIG. 8 is a flowchart representing an illustrative process for dynamically modifying a playlist for reviewing highlights of an event by extending or shortening a segment in accordance with some embodiments of the disclosure.

FIG. 8 is a flowchart representing an illustrative process for dynamically modifying a playlist for reviewing highlights of an event by extending or shortening a segment in accordance with some embodiments of the disclosure. The flowchart in FIG. 8 represents a process 800 implemented on control circuitry 504 for dynamically modifying a playlist for reviewing highlights of an event by extending a segment according to an embodiment of the disclosure. It should be noted that process 800 or any action thereof could be performed on, or provided by, any of the devices shown in FIGS. 5-6. For example, process 800 may be executed by control circuitry 504 (FIG. 5) as instructed by a media guidance application implemented on a user device (e.g., user equipment devices 602, 604, and/or 606 (FIG. 6), as well as display screen 100 (FIG. 1)) in order to dynamically modify a playlist for reviewing highlights of an event by extending or shortening a segment. In addition, one or more actions of process 800 may be incorporated into or combined with one or more actions of any other process or embodiment described herein.

At 802, control circuitry 504 may receive user input identifying an event for which the user wished to view highlights. For example, a user may select, using "OK" button 212 of user input device 200, an event from grid 302. Control circuitry 504 may receive commands from user input device 200 via user input interface 510. For example, a user may select an event representing a football game, an episode of a television show such as the program series "Game of Thrones," all football games relating to a particular team or player, or an entire season of a television show such as the program series "Game of Thrones."

At 804, control circuitry 504 may attempt to identify a media asset or assets featuring the selected event or event. For example, the selected event may be a football game that was broadcast the preceding day. Control circuitry 504 may access program guide data associated with the football game from media guidance data source 618, via communications network 614, to determine a unique identifier of the media asset featuring the football game. For example, each entry in the program guide data may include a unique identifier for each media asset, such as a database entry, program ID, hash value, or index number. Control circuitry 504 may access media content source 616, via communications network 614, to determine is the identified media asset is available. Control circuitry 504 may, alternatively or additionally, access locally recorded media assets, for example from storage 508, to determine if the identified media asset is locally available. As another example, the selected events may be an entire season of the program series "Game of Thrones." Control circuitry 504 may access program guide data associated with each episode of the selected season of the program series "Game of Thrones" from media guidance data source 618, via communications network 614, to determine a unique identifier of each media asset comprising the selected season.

At 806, control circuitry 504 may generate a playlist of highlights including a plurality of segments, each segment representing a different highlight of the selected event. For example, upon receiving selection of a football game, control circuitry 504 may generate a playlist of highlights including a plurality of segments, each segment representing a different highlight from the football game. As another example, control circuitry 504 may receive selection of an episode of the program series "Game of Thrones." Control circuitry 504 may generate a playlist of highlights including a plurality of segments, each segment representing a different highlight from the episode. As yet another example, control circuitry 504 may receive selection of an entire season of the program series "Game of Thrones." Control circuitry 504 may generate a playlist of highlights including a plurality of segments from each episode of the selected season of the program series "Game of Thrones," each segment representing a different highlight from the episode from which it was taken.

At 808, control circuitry 504 may begin playing back the playlist of highlights, beginning with the first segment. For example, playback of the playlist of highlights may begin automatically in response to a user request to view the highlights. Alternatively, playback of the playlist of highlights may not begin until a user command is received to begin playback. For example, Control circuitry 504 may process the video and audio data comprising the segment and output them to user equipment (e.g., user equipment 602, 604, or 606, display 512, speakers 514, or display screen 100).

At 810, during playback of a particular segment of the playlist of highlights, control circuitry 504 may receive a user request to extend or shorten the particular segment. For example, control circuitry 504 may receive the request from a user input device (e.g., user input device 200) via user input interface 510. For example, the user may press "Extend" button 208, "Shorten" button 210, or "Extend/Shorten" button 214. In response, control circuitry 504 may generate for display menu 102, menu 104, menu 106, menu 108, menu 110, menu 112, or menu 114.

At 812, control circuitry 504 may determine whether the received user request is a request to extend the current segment or shorten the current segment. Using the user input device 200, the user may choose, for example, the "View 30 seconds pre/post" option from menu 102, menu 110, menu 112, or menu 114, using numeric keypad 218, "OK" button 212, or voice commands, requesting that the current segment be extended by a total of one minute, with thirty seconds added to both the beginning and end of the segment. The user may choose, for example, the "View 2 minutes pre/post" option from menu 102, menu 110, menu 112, or menu 114, using numeric keypad 218, "OK" button 212, or voice commands, requesting that the current segment be extended by a total of four minutes, with two minutes added to both the beginning and end of the segment. The user may choose, for example, the "View 5 minutes pre/post" option from menu 102, menu 110, menu 112, or menu 114, using numeric keypad 218, "OK" button 212, or voice commands, requesting that the current segment be extended by a total of five minutes, with two minutes and thirty seconds being added to both the beginning and end of the segment. The user may choose, for example, the "View entire event" option from menu 102, menu 110, menu 112, or menu 114, using numeric keypad 218, "OK" button 212, or voice commands, requesting that the current segment and all segments taken from the same media asset as the current segment be removed from the playlist of highlights and the current segment replaced with the full media asset, as described above. In response to any of the above selections, control circuitry 504 may determine that the received user request is a request to extend the current segment.

At 814, control circuitry 504 may determine information associated with the current segment that identifies a starting play position and an ending play position within a media asset featuring the event that corresponds to the current segment. For example, control circuitry 504 may access information associated with the first segment, such as metadata, which may be stored with the playlist, or within each segment. The starting play position may represent an amount of time from the beginning of the media asset. The ending play position may also represent an amount of time from the beginning of the media asset, or may represent an amount of time from the starting play position (i.e., the duration of the first segment). For example, the current segment may include information, such as metadata, indicating a starting play position corresponding to ten minutes and fifteen seconds from the start of the media asset, and an ending play position corresponding to twelve minutes and five seconds from the start of the media asset. Alternatively or additionally, the current segment may include information, such as metadata, indicating the duration of the segment is one minute and fifty seconds.

Alternatively or additionally, the current segment may include information, such as metadata, indicating the time at which the segment was broadcast. For example, the current segment may include information, such as metadata, indicating a starting play position corresponding to 8:10 PM. Control circuitry 504 may determine a starting play position in the media asset corresponding to the broadcast time by computing a difference, in seconds or in any other suitable time unit, between the broadcast start time of the media asset and the broadcast time of the current segment. For example, the broadcast start time of the media asset may be 8:00 PM. Control circuitry 504 may compute a difference of ten minutes between the starting play position, corresponding to 8:10 PM and the broadcast start time of the media asset.

At 816, control circuitry 504 may access the media asset at a position corresponding to the determined start time of the current segment. For example, control circuitry 504 may use metadata of the media asset, such as frame rate, to identify a frame within the media asset that corresponds to the determined start time. Control circuitry 504 may then access a memory address associated with the identified frame.

At 818, control circuitry 504 may generate an extended version of the current segment by capturing a portion of the media asset starting from a play position that precedes the starting play position of the current segment and ending at a play position that follows the ending play position of the current segment. For example, the current segment may represent a touchdown in a football game. Using metadata of the media asset, such as group-of-picture ("GOP") boundaries, chapter or scene listings, or using data from a remote server, such as media guidance data source 618, control circuitry 504 may capture the portion of the media asset beginning, for example, the portion of the touchdown play prior to the touchdown itself, and ending with, for example, a celebratory dance of the scoring player following the touchdown. As another example, the current segment may represent a portion of the Red Wedding scene from the program series "Game of Thrones." Using metadata of the media asset, or data from a remote server, such as media guidance data source 618, control circuitry 504 may capture a portion of the media asset beginning with, for example, the start of the Red Wedding scene, and ending with the end of the Red Wedding scene.

Alternatively, at 812, using the user input device 200, the user may choose, for example, the "Skip this highlight" option from menu 104, menu 108, menu 110, or menu 114, using numeric keypad 218, "OK" button 212, or voice commands, requesting that the current segment be removed from the playlist of highlights, and playback resumed with the following segment of the playlist of highlights. The user may choose, for example, the "Skip similar highlights" option from menu 104, menu 108, menu 110, or menu 114, using numeric keypad 218, "OK" button 212, or voice commands, requesting that the current segment and all segments determined to be similar to the current segment, as described above, be removed from the playlist of highlights, and playback resumed with the next available segment. The user may choose, for example, the "Skip all from this event" option from menu 104, menu 108, menu 110, or menu 114, using numeric keypad 218, "OK" button 212, or voice commands, requesting that all segments taken from the same media asset as the current segment, as described above, be removed from the playlist of highlights, and playback resumed with the next available segment. The user may choose, for example, the "Shorten this highlight" option from menu 106, menu 108, menu 112, or menu 114, using numeric keypad 218, "OK" button 212, or voice commands, requesting that the current segment be shortened by removing a portion of the segment, as described above The user may choose, for example, the "Shorten similar highlights" option from menu 106, menu 108, menu 112, or menu 114, using numeric keypad 218, "OK" button 212, or voice commands, requesting that the current segment and all segments determined to be similar to the current segment, as described above, be shortened by removing a portion of each similar segment. The user may choose, for example, the "Shorten all from this event" option from menu 106, menu 108, menu 112, or menu 114, using numeric keypad 218, "OK" button 212, or voice commands, requesting that all segments determined to have been taken from the same media asset as the current segment, as described above, be shortened by removing a portion of each segment taken from the same media asset as the current segment. In response to any of the above selections, control circuitry 504 may determine that the received user request is a request to shorten the current segment.

At 820, control circuitry 504 may generate a shortened version of the segment by removing a portion of the segment. For example, control circuitry 504 may access the playlist of highlights from, for example, storage 508, and generate an editable copy of the current segment. For example, the current segment may represent an entire play in a football game which results in a touchdown. Using metadata of the media asset, such as group-of-picture ("GOP") boundaries, chapter or scene listings, or using data from a remote server, such as media guidance data source 618, control circuitry 504 may remove the portion of the segment including, for example, the portion of the touchdown play prior to the touchdown itself, and may remove a portion of the segment including, for example, a celebratory dance of the scoring player following the touchdown. As another example, the current segment may represent the Red Wedding scene from an episode of the program series "Game of Thrones." Using metadata of the media asset, or data from a remote server, such as media guidance data source 618, control circuitry 504 may remove a portion of the media asset including, for example, the first part of the Red Wedding scene, and may remove a portion of the segment including, for example, a last part of the Red Wedding scene, leaving only the climactic portion of the scene.

At 822, control circuitry 504 may replace the current segment in the playlist with the extended or shortened version of the segment. For example, control circuitry 504 may access the playlist of highlights stored, for example, in storage 508, and replace the portion of the data representing the playlist of highlights corresponding to the current segment with data representing the captured extended segment, or generated shortened segment.

At 824, control circuitry 504 may play back the playlist starting from the extended or shortened version of the current segment. For example, control circuitry 504 may play back the extended version of the current segment from the beginning, or from a play position corresponding to the play position of the original segment at the time the original segment was replaced by the extended or shortened version of the segment.

It is contemplated that the actions or descriptions of FIG. 8 may be used with any other embodiment of this disclosure. In addition, the actions and descriptions described in relation to FIG. 8 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 5-6 could be used to perform one or more of the actions in FIG. 8.

FIG. 9 is a flowchart representing an illustrative process for determining information associated with the first segment that identifies a starting play position and an ending play position within a media asset in accordance with some embodiments of the disclosure. The flowchart in FIG. 9 represents a process 900 implemented on control circuitry 504 for determining information associated with the first segment that identifies a starting play position and an ending play position within a media asset according to an embodiment of the disclosure. It should be noted that process 900 or any action thereof could be performed on, or provided by, any of the devices shown in FIGS. 5-6. For example, process 1000 may be executed by control circuitry 504 (FIG. 5) as instructed by a media guidance application implemented on a user device (e.g., user equipment devices 602, 604, and/or 606 (FIG. 6), as well as display screen 100 (FIG. 1)) in order to determine information associated with the first segment that identifies a starting play position and an ending play position within a media asset. In addition, one or more actions of process 900 may be incorporated into or combined with one or more actions of any other process or embodiment described herein.

At 902, control circuitry may capture a first frame of the segment. For example, control circuitry 504 may include a video processing module configured to extract single still frames from video data. Control circuitry 504 may access the playlist stored in, for example, storage 508, and retrieve data representing the current segment. Control circuitry 504 may extract a single still frame from the start of the current segment. The frame may be, for example, an I-frame.

At 904, control circuitry may identify a media asset featuring the event, as described above with reference to FIG. 8.

At 906, control circuitry 504 may search images of frames of the media asset to locate an image that matches the first frame. For example, a database of images of frames of the media asset may be located in storage 508, or on a remote server such as media guidance data source 618. Control circuitry 504 may include an image recognition module configured to detect corresponding images based on, for example, degrees of similarity between images. For example, control circuitry 504 may determine if an image of frame of the media asset matches a frame extracted from the current segment by comparing the position and orientation of various objects in the extracted frame with those in an image of a frame of the media asset. If similar objects appear in similar positions and orientations in both images, the image of a frame of the media asset may record a similarity score for each image, for example, as a percentage of similarity based on the number of objects in the frame of the media asset which correspond to objects in the extracted frame, and the position and orientation of each corresponding object within the frame of the media asset relative to the position and orientation of each corresponding object in the extracted frame. After processing each of the images of frames of the media asset, control circuitry 504 may select the image with the highest similarity score as representing a starting play position of the current segment within the media asset. Control circuitry 504 may access metadata associated with the image of the frame of the media asset to determine the position within the media asset to which the frame corresponds. Control circuitry 504 may, from metadata of the current segment relating to the duration of the current segment and the selected image of a frame of the media asset, determine a corresponding ending play position within the media asset.

It is contemplated that the actions or descriptions of FIG. 9 may be used with any other embodiment of this disclosure. In addition, the actions and descriptions described in relation to FIG. 9 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 5-6 could be used to perform one or more of the actions in FIG. 9.

FIG. 10 is a flowchart representing an illustrative process for extending segments and playing back an extended segment in accordance with some embodiments of the disclosure. The flowchart in FIG. 10 represents a process 1000 implemented on control circuitry 504 for dynamically modifying a playlist for reviewing highlights of an event by extending a segment according to an embodiment of the disclosure. It should be noted that process 1000 or any action thereof could be performed on, or provided by, any of the devices shown in FIGS. 5-6. For example, process 1000 may be executed by control circuitry 504 (FIG. 5) as instructed by a media guidance application implemented on a user device (e.g., user equipment devices 602, 604, and/or 606 (FIG. 6), as well as display screen 100 (FIG. 1)) in order to generate a playlist of extended segments and play back an extended segment. In addition, one or more actions of process 1000 may be incorporated into or combined with one or more actions of any other process or embodiment described herein.

At 1002, control circuitry 504 may receive user input identifying an event for which the user wished to view highlights. For example, a user may select, using "OK" button 212 of user input device 200, an event from grid 302. Control circuitry 504 may receive commands from user input device 200 via user input interface 510. For example, a user may select an event representing a football game, an episode a television show such as the program series "Game of Thrones," all football games relating to a particular team or player, or an entire season of a television show such as the program series "Game of Thrones."

At 1004, control circuitry 504 may generate a first playlist of highlights including a plurality of segments, each segment representing a different highlight of the selected event. For example, upon receiving selection of a football game, control circuitry 504 may generate a first playlist of highlights including a plurality of segments, each segment representing a different highlight from the football game. As another example, control circuitry 504 may receive selection of an episode of the program series "Game of Thrones." Control circuitry 504 may generate a first playlist of highlights including a plurality of segments, each segment representing a different highlight from the episode. As yet another example, control circuitry 504 may receive selection of an entire season of the program series "Game of Thrones." Control circuitry 504 may generate a first playlist of highlights including a plurality of segments from each episode of the selected season, each segment representing a different highlight from the episode from which it was taken.

At 1006, control circuitry 504 may generate a second playlist of highlights including a plurality of segments, wherein each segment is an extended version of a corresponding segment in the first playlist of highlights. For example, in generating the first playlist of highlights, control circuitry 504 may capture portions of the media asset featuring the event which contain exciting or climactic events, as may be determined from, for example, a database of events within the event which may be stored locally (e.g., in storage 508), or on a remote server (e.g., media guidance data source 618). In generating the second playlist of highlights, control circuitry 504 may capture portions of the media asset featuring the event beginning, for example, at a predetermined or user-selected period of time before the exciting or climactic event, and ending, for example, at a predetermined or user-selected period of time after the exciting or climactic event.

At 1008, control circuitry 504 may begin playing back the playlist of highlights, beginning with the first segment. Control circuitry 504 may process the video and audio data of the segment and output them to user equipment (e.g., user equipment 602, 604, or 606, display 512, speakers 514, or display screen 100).

At 1010, during playback of a particular segment of the playlist of highlights, control circuitry 504 may receive a user request to extend the particular segment. Control circuitry 504 may receive the request from a user input device (e.g., user input device 200) via user input interface 510. Using the user input device 200, the user may choose, for example, the "View 30 seconds pre/post" option from menu 102, menu 110, menu 112, or menu 114, using numeric keypad 218, "OK" button 212, or voice commands, requesting that the current segment be extended by a total of one minute, with thirty seconds added to both the beginning and end of the segment. The user may choose, for example, the "View 2 minutes pre/post" option from menu 102, menu 110, menu 112, or menu 114, using numeric keypad 218, "OK" button 212, or voice commands, requesting that the current segment be extended by a total of four minutes, with two minutes added to both the beginning and end of the segment. The user may choose, for example, the "View 5 minutes pre/post" option from menu 102, menu 110, menu 112, or menu 114, using numeric keypad 218, "OK" button 212, or voice commands, requesting that the current segment be extended by a total of five minutes, with two minutes and thirty seconds being added to both the beginning and end of the segment. The user may choose, for example, the "View entire event" option from menu 102, menu 110, menu 112, or menu 114, using numeric keypad 218, "OK" button 212, or voice commands, requesting that the current segment and all segments taken from the same media asset as the current segment be removed from the playlist of highlights and the current segment replaced with the full media asset, as described above.

At 1012, control circuitry 504 may play back the second playlist of highlights starting from the extended version of the current segment. For example, control circuitry 504 may play back the extended version of the current segment from the beginning, or from a play position corresponding to the play position of the original segment at the time the original segment was replaced by the extended version of the segment. After playing back he extended segment from the second playlist of highlights control circuitry 504 may resume playing back the first playlist of highlights, beginning from the next segment.

It is contemplated that the actions or descriptions of FIG. 10 may be used with any other embodiment of this disclosure. In addition, the actions and descriptions described in relation to FIG. 10 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 5-6 could be used to perform one or more of the actions in FIG. 10.

FIG. 11 is a flowchart representing an illustrative process for generating a playlist of shortened segments according to some embodiments of the disclosure. The flowchart in FIG. 11 represents a process 1100 implemented on control circuitry 504 for generating a playlist of shortened segments according to an embodiment of the disclosure. It should be noted that process 1100 or any action thereof could be performed on, or provided by, any of the devices shown in FIGS. 5-6. For example, process 1100 may be executed by control circuitry 504 (FIG. 5) as instructed by a media guidance application implemented on a user device (e.g., user equipment devices 602, 604, and/or 606 (FIG. 6), as well as display screen 100 (FIG. 1)) in order to generate a playlist of extended segments and play back an extended segment. In addition, one or more actions of process 1100 may be incorporated into or combined with one or more actions of any other process or embodiment described herein.

At 1102, control circuitry 504 may receive user input identifying an event for which the user wishes to view highlights. For example, a user may select, using "OK" button 212 of user input device 200, an event from grid 302. Control circuitry 504 may receive commands from user input device 200 via user input interface 510. For example, a user may select an event representing a football game, an episode a television show such as the program series "Game of Thrones," all football games relating to a particular team or player, or an entire season of a television show such as the program series "Game of Thrones."

At 1104, control circuitry 504 may generate a first playlist of highlights including a plurality of segments, each segment representing a different highlight of the selected event. For example, upon receiving selection of a football game, control circuitry 504 may generate a first playlist of highlights including a plurality of segments, each segment representing a different highlight from the football game. As another example, control circuitry 504 may receive selection of an episode of the program series "Game of Thrones." Control circuitry 504 may generate a first playlist of highlights comprising a plurality of segments, each segment representing a different highlight from the episode. As yet another example, control circuitry 504 may receive selection of an entire season of the program series "Game of Thrones." Control circuitry 504 may generate a first playlist of highlights including a plurality of segments from each episode of the selected season, each segment representing a different highlight from the episode from which it was taken.

At 1106, control circuitry 504 may generate a second playlist of highlights including a plurality of segments, wherein each segment is an extended version of a corresponding segment in the first playlist of highlights. For example, in generating the first playlist of highlights, control circuitry 504 may capture portions of the media asset featuring the event which contain entire discrete events, as may be determined from, for example, a database of events within the media event which may be stored locally (e.g., in storage 508), or on a remote server (e.g., media guidance data source 618). The segments of the first playlist of highlights may each be of a set length, such as five minutes, or may be of varying lengths, with the length of each segment based on the duration of the discrete event featured in the segment, which may be determined from, for example, a database of events within the event which may be stored locally (e.g., in storage 508) or on a remote server (e.g., media guidance data source 618). For example, the event featured in a segment may be a touchdown play in a football game. The entire touchdown play may have a duration of three minutes and forty-five seconds, resulting in a segment three minutes and forty-five seconds in length. In generating the second playlist of highlights, control circuitry 504 may capture portions of the media asset featuring the event beginning, for example, at a position in the media asset corresponding to the beginning of an exciting or climactic event, and ending, for example, immediately after the exciting or climactic event. For example, a segment of the second playlist of highlights corresponding to the three-minute-and-forty-five second segment described above may contain only two minutes and ten seconds of content representing the final yards of the player running the ball into the end zone. The segments of each playlist of highlights are ordered according to the order of each highlight as they appear in the media event, such that a playlist of highlights represents a summarized version of the media event.

It is contemplated that the actions or descriptions of FIG. 11 may be used with any other embodiment of this disclosure. In addition, the actions and descriptions described in relation to FIG. 11 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 5-6 could be used to perform one or more of the actions in FIG. 11.

FIG. 12 is a flowchart representing an illustrative process for generating an extended version of a segment based on an amount of time associated with a request to extend the segment according to some embodiments of the disclosure. The flowchart in FIG. 12 represents a process 1200 implemented on control circuitry 504 for generating an extended version of a segment based on an amount of time associated with a request to extend the segment according to an embodiment of the disclosure. It should be noted that process 1200 or any action thereof could be performed on, or provided by, any of the devices shown in FIGS. 5-6. For example, process 1200 may be executed by control circuitry 504 (FIG. 5) as instructed by a media guidance application implemented on a user device (e.g., user equipment devices 602, 604, and/or 606 (FIG. 6), as well as display screen 100 (FIG. 1)) in order to generate a playlist of extended segments and play back an extended segment. In addition, one or more actions of process 1200 may be incorporated into or combined with one or more actions of any other process or embodiment described herein.

At 1202, during playback of a particular segment of the playlist of highlights, control circuitry 504 may receive a user request to extend the particular segment. For example, control circuitry 504 may receive the request from a user input device (e.g., user input device 200) via user input interface 510. For example, the user may press "Extend" button 208, or "Extend/Shorten" button 214. In response, control circuitry 504 may generate for display menu 102, menu 110, menu 112, or menu 114. Using the user input device 200, the user may choose, for example, the "View 30 seconds pre/post" option from menu 102, menu 110, menu 112, or menu 114, using numeric keypad 218, "OK" button 12, or voice commands, requesting that the current segment be extended by a total of one minute, with thirty seconds added to both the beginning and end of the segment. The user may choose, for example, the "View 2 minutes pre/post" option from menu 102, menu 110, menu 112, or menu 114, using numeric keypad 218, "OK" button 212, or voice commands, requesting that the current segment be extended by a total of four minutes, with two minutes added to both the beginning and end of the segment. The user may choose, for example, the "View 5 minutes pre/post" option from menu 102, menu 110, menu 112, or menu 114, using numeric keypad 218, "OK" button 212, or voice commands, requesting that the current segment be extended by a total of five minutes, with two minutes and thirty seconds being added to both the beginning and end of the segment.

At 1304, control circuitry 504 may determine an amount of time associated with the request to extend the current segment. For example, user selection of a menu option from menu 102, menu 110, menu 112, or menu 114 may include a predetermined amount of time by which to extend the current segment. For example, the "View 30 seconds pre/post" option of menu 102, menu 110, menu 112, and 114 includes a predetermined amount of time of one minute by which to extend the current segment. In response to receiving selection of this option, control circuitry 504 may determine a predetermined amount of time of one minute by which to extend the current segment. The "View 2 minutes pre/post" option of menu 102, menu 110, menu 112, and menu 114 includes a predetermined about of time of four minutes by which to extend the current segment. In response to receiving selection of this option, control circuitry 504 may determine a predetermined time of four minutes by which to extend the current segment. The "View 5 minutes pre/post" option of menu 102, menu 110, menu 112, and menu 114 includes a predetermined amount of time of ten minutes by which to extend the current segment. In response to selection of this option, control circuitry 504 may determine a predetermined time of ten minutes by which to extend the current segment. Alternatively, in response to receiving a user request to extend the current segment, control circuitry 504 may request additional user input to specify the amount of time by which the extend the current segment. User input specify the amount of time may be made, for example, using numeric keypad 218, or may be selected from a list of predetermined amounts of time using "OK" button 212.

At 1206, control circuitry 504 may determine information associated with the current segment that identifies a starting play position and an ending play position within a media asset featuring the event that corresponds to the current segment. For example, control circuitry 504 may access information associated with the first segment, such as metadata, which may be stored with the playlist, or within each segment. The starting play position may represent an amount of time from the beginning of the media asset. The ending play position may also represent an amount of time from the beginning of the media asset, or may represent an amount of time from the starting play position (i.e., the duration of the first segment). For example, the current segment may include information, such as metadata, indicating a starting play position corresponding to ten minutes and fifteen seconds from the start of the media asset, and an ending play position corresponding to twelve minutes and five seconds from the start of the media asset. Alternatively or additionally, the current segment may include information, such as metadata, indicating the duration of the segment is one minute and fifty seconds.

Alternatively or additionally, the current segment may include information, such as metadata, indicating the time at which the segment was broadcast. For example, the current segment may include information, such as metadata, indicating a starting play position corresponding to 8:10 PM. Control circuitry 504 may determine a starting play position in the media asset corresponding to the broadcast time by computing a difference, in seconds or in any other suitable time unit, between the broadcast start time of the media asset and the broadcast time of the current segment. For example, the broadcast start time of the media asset may be 8:00 PM. Control circuitry 504 may compute a difference of ten minutes between the starting play position, corresponding to 8:10 PM and the broadcast start time of the media asset.

At 1208, control circuitry 504 may access the media asset at a position corresponding to the determined start time of the current segment. For example, control circuitry 504 may use metadata of the media asset, such as frame rate, to identify a frame within the media asset that corresponds to the determined start time. Control circuitry 504 may then access a memory address associated with the identified frame.

At 1210, control circuitry 504 may generate an extended version of the current segment by capturing a portion of the media asset starting from a play position that precedes the starting play position of the current segment by half of the determined amount of time, and ending at a play position that follows the ending play position of the current segment by half of the determined amount of time. For example, the current segment may represent a touchdown in a football game. The determined amount of time may be one minute. Control circuitry 504 may therefore capture the portion of the media asset beginning at a position thirty seconds prior to the touchdown play, and ending at a position thirty seconds following the touchdown. As another example, the current segment may represent a portion of the Red Wedding scene from an episode of the program series "Game of Thrones." Based on the determined amount of time of one minute, control circuitry 504 may capture a portion of the media asset beginning thirty seconds before the start of the Red Wedding scene, and ending thirty seconds after the end of the Red Wedding scene. Alternatively, control circuitry 504 may add an amount of time to the beginning of the segment, and a different amount of time to the end of the segment, or may add time only to the beginning of the segment or only to the end of the segment, based on content of the segment. For example, the segment requested to be extended by represent a touchdown in a football game, and may include forty-five seconds of content showing the player running down the field, avoiding attempts by the opposing team to tackle the player, and reaching the end zone. Upon receiving a request to extend the segment, control circuitry 504 may access a database of events in the football game, either stored locally (e.g., in storage 508) or on a remote server (e.g. media guidance data source 618). The database of evens in the football game may include starting and ending times within the media asset featuring the football game for each discrete play. Control circuitry 504 may identify an entry in the database corresponding to the current segment, for example using a unique identifier, or using metadata of the segment relating to the time within the media asset corresponding to the segment, and determining a database entry whose starting time and ending time encompass the current segment. Control circuitry 504 may access the media asset featuring the football game and extract media data from the media asset beginning at the starting time specified in the database entry, and ending and the ending time specified in the database entry.

It is contemplated that the actions or descriptions of FIG. 12 may be used with any other embodiment of this disclosure. In addition, the actions and descriptions described in relation to FIG. 12 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 5-6 could be used to perform one or more of the actions in FIG. 12.

FIG. 13 is a flowchart representing an illustrative process for generating extended versions of similar segments according to some embodiments of the disclosure. The flowchart in FIG. 13 represents a process 1300 implemented on control circuitry 504 for generating extended versions of similar segments according to an embodiment of the disclosure. It should be noted that process 1300 or any action thereof could be performed on, or provided by, any of the devices shown in FIGS. 5-6. For example, process 1300 may be executed by control circuitry 504 (FIG. 5) as instructed by a media guidance application implemented on a user device (e.g., user equipment devices 602, 604, and/or 606 (FIG. 6), as well as display screen 100 (FIG. 1)) in order to generate a playlist of extended segments and play back an extended segment. In addition, one or more actions of process 1300 may be incorporated into or combined with one or more actions of any other process or embodiment described herein.

At 1302, during playback of a particular segment of the playlist of highlights, control circuitry 504 may receive a user request to extend the particular segment and all similar segments. Control circuitry 504 may receive the request from a user input device (e.g., user input device 200) via user input interface 510. For example, the user may press "Extend" button 208 or "Extend/Shorten" button 214. In response, control circuitry 504 may generate for display a menu including options for extending the current segment or similar segments. Using the user input device 200, the user may choose, for example, an option from the menu requesting that the segments similar to the current segment be expanded, each by a total of one minute, with thirty seconds added to both the beginning and end of each similar segment.

At 1304, control circuitry 504 may identify an attribute of the current segment. Control circuitry 504 may include a video processing module configured to identify types of video content, as well as objects contained within the video content. For example, control circuitry 504 may process the video content of the current segment to identify as an attribute the type of event featured in the segment, such as a touchdown. Control circuitry 504 may identify and an attribute the team that scored the touchdown and/or the player that scored the touchdown. As another example, the current segment may feature the Red Wedding scene from an episode of the program series "Game of Thrones." Control circuitry 504 may identify as an attribute each character present in the scene. Each identified attribute of the current segment may be stored in a database, flat file, or other data structure in, for example, storage 508.

At 1306, control circuitry 504 may search the segments of the playlist of highlights to identify a subset of segments that correspond to the identified attributes. Control circuitry 504 may process each segment in the manner described above to identify attributes of each segment. Alternatively or additionally, control circuitry 504 may access a database of attributes for each segment, stored locally in storage 508 or at a remote server such as media guidance data source 618. Control circuitry 504 may compare the attributes of the current segment with the attributes of each segment in the playlist to determine a subset of segments that have at least one similar attribute. Control circuitry 504 may determine an importance level of each attribute from a database of importance levels stored locally in storage 508 or at a remote server such as media guidance data source 618. Control circuitry 504 may use the importance level of each attribute of the current segment to determine which attribute is most important. Control circuitry 504 may, for example, search for segments in the playlist having the attribute of the current segment determined to be of highest importance.

At 1308, control circuitry 504 may identify portions of the media asset that correspond to the subset of segments. Control circuitry 504 determine information associated with each segment of the subset of segments that identifies a starting play position and an ending play position within a media asset featuring the event that corresponds to the current segment. Control circuitry 504 may access information associated with each segment, such as metadata, which may be stored with the playlist of highlights, or within each segment. The starting play position may represent an amount of time from the beginning of the media asset. The ending play position may also represent an amount of time from the beginning of the media asset, or may represent an amount of time from the starting play position (i.e., the duration of the first segment). For example, each segment may include information, such as metadata, indicating a starting play position corresponding and an ending play position. Alternatively or additionally, each segment may include information, such as metadata, indicating the duration of the segment.

Alternatively or additionally, each segment may include information, such as metadata, indicating the time at which the segment was broadcast. For example, each segment may include information, such as metadata, indicating a starting play position corresponding to a specific time. Control circuitry 504 may determine a starting play position in the media asset corresponding to the broadcast time by computing a difference, in seconds or in any other suitable time unit, between the broadcast start time of the media asset and the broadcast time of each segment. For example, the broadcast start time of the media asset may be 8:00 PM. Control circuitry 504 may compute a difference between the starting play position the broadcast start time of the media asset, wherein each segment has a start time after 8:00 PM.

Control circuitry 504 may access the media asset at a position corresponding to the determined start time of each segment. For example, control circuitry 504 may use metadata of the media asset, such as frame rate, to identify a frame within the media asset that corresponds to the determined start time. Control circuitry 504 may then access a memory address associated with the identified frame.

At 1310, control circuitry 504 may generate an extended version of each segment by capturing a portion of the media asset starting from a play position that precedes the starting play position of each segment and ending at a play position that follows the ending play position of each segment. Control circuitry 504 may use metadata of the media asset, such as group-of-picture ("GOP") boundaries, chapter or scene listings, or using data from a remote server, such as media guidance data source 618, to capture the portion of the media asset starting from a position preceding the starting play position and ending after the ending play position of each segment of the subset of segment.

It is contemplated that the actions or descriptions of FIG. 13 may be used with any other embodiment of this disclosure. In addition, the actions and descriptions described in relation to FIG. 13 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 5-6 could be used to perform one or more of the actions in FIG. 13.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel.

In addition, the systems and methods described herein may be performed in real time. It should also be noted, the systems and/or methods described above may be applied to, or used in accordance with, other systems and/or methods.

What is claimed is:

1. A method, comprising:
receiving a request to summarize a subset of a plurality of media assets;
based at least in part on receiving the request to summarize, generating a playlist comprising a plurality of segments from the subset of a plurality of media assets;
receiving a request to modify a duration of a first segment of the plurality of segments;
based at least in part on receiving the request to modify the duration of the first segment:
determining an attribute of the first segment; and
generating modified segments by modifying a duration of each segment in a subset of the plurality of segments having the attribute;
generating a modified playlist by replacing each segment in the subset of the plurality of segments having the attribute with its corresponding modified segment; and
playing back the modified playlist.

2. The method of claim 1, further comprising generating, for output, the playlist, wherein receiving the request to modify the duration of the first segment is based at least in part on generating the playlist.

3. The method of claim 2, further comprising receiving a request to output the playlist, wherein generating, for output, the playlist (i) comprises playing back the playlist and (ii) is based at least in part on receiving the request to output the playlist.

4. The method of claim 1, wherein the request to modify the duration of the first segment is received while the first segment is being played back.

5. The method of claim 4, wherein playing back the modified playlist comprises starting playback from the modified version of the first segment.

6. The method of claim 1, wherein the subset of the plurality of media assets comprises a subset of a series of media assets.

7. The method of claim 6, wherein the subset of the series of media assets comprises episodes for a program series.

8. The method of claim 1, wherein:
determining an attribute of the first segment comprises determining the first segment comprises a story arc; and
each segment in the subset of the plurality of segments having the attribute that comprises the story arc.

9. The method of claim 1, wherein the request to summarize the subset of the plurality of media assets includes a broadcast time for the subset of the plurality of media assets.

10. The method of claim 9, wherein the subset of the plurality of media assets comprises highlights of the plurality of media assets corresponding to the broadcast time.

11. A system, comprising:
a communication port;
a memory storing instructions; and
control circuitry communicably coupled to the memory and the communication port and configured to execute the instructions to:
receive a request to summarize a subset of a plurality of media assets;
based at least in part on receiving the request to summarize, generate a playlist comprising a plurality of segments from the subset of a plurality of media assets;

receive a request to modify a duration of a first segment of the plurality of segments;

based at least in part on receiving the request to modify the duration of the first segment:

determine an attribute of the first segment; and generate modified segments by modifying a duration of each segment in a subset of the plurality of segments having the attribute;

generate a modified playlist by replacing each segment in the subset of the plurality of segments having the attribute with its corresponding modified segment; and play back the modified playlist.

12. The system of claim 11, wherein:

the control circuitry is further configured to generate, for output, the playlist; and receiving the request to modify the duration of the first segment is based at least in part on generating the playlist.

13. The system of claim 12, wherein:

the control circuitry is further configured to receive a request to output the playlist; and the control circuitry configured to generate, for output, the playlist in configured to do so (i) by playing back the playlist and (ii) based at least in part on receiving the request to output the playlist.

14. The system of claim 11, wherein the request to modify the duration of the first segment is received while the first segment is being played back.

15. The system of claim 14, wherein the control circuitry is further configured to play back the modified playlist by starting playback from the modified version of the first segment.

16. The system of claim 11, wherein the subset of the plurality of media assets comprises a subset of a series of media assets.

17. The system of claim 16, wherein the subset of the series of media assets comprises episodes for a program series.

18. The system of claim 11, wherein:

the control circuitry is further configured to determine an attribute of the first segment by determining that the first segment comprises a story arc; and each segment in the subset of the plurality of segments having the attribute comprises the story arc.

19. The system of claim 11, wherein the request to summarize the subset of the plurality of media assets includes a broadcast time for the subset of the plurality of media assets.

20. The system of claim 19, wherein the subset of the plurality of media assets comprises highlights of the plurality of media assets corresponding to the broadcast time.

* * * * *